United States Patent
Niranjayan et al.

(10) Patent No.: US 10,990,923 B1
(45) Date of Patent: *Apr. 27, 2021

(54) SYSTEM AND METHOD FOR TRACKING OBJECTS WITHIN A FACILITY

(71) Applicant: AMAZON TECHNOLOGIES, INC., Seattle, WA (US)

(72) Inventors: Somasundaram Niranjayan, Issaquah, WA (US); Nathan Pius O'Neill, Snohomish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/721,479

(22) Filed: Dec. 19, 2019

Related U.S. Application Data

(63) Continuation of application No. 15/799,780, filed on Oct. 31, 2017, now Pat. No. 10,515,337.

(51) Int. Cl.
*G06T 7/20* (2017.01)
*G06K 9/00* (2006.01)
(Continued)

(52) U.S. Cl.
CPC ....... *G06Q 10/087* (2013.01); *G06K 9/00778* (2013.01); *G06K 9/00979* (2013.01);
(Continued)

(58) Field of Classification Search
CPC .. G06K 9/00771; G06K 9/00778; G06T 7/20; G06T 2207/30196; G06T 2207/30232;
(Continued)

(56) References Cited

U.S. PATENT DOCUMENTS

| | | | |
|---|---|---|---|
| 5,838,828 A | 11/1998 | Mizuki et al. | 382/236 |
| 7,225,980 B2 | 6/2007 | Ku et al. | 235/383 |

(Continued)

OTHER PUBLICATIONS

Asthana, Abhaya, et al., "An Indoor Wireless System for Personalized Shopping Assistance", CiteSeerX, In Proceedings of IEEE Workshop on Mobile Computing Systems and Applications, 1994, 6 pages. Retrieved from the Internet: http://citeseerx.ist.psu.edu/viewdoc/summary?doi=10.1.1.127.3303.

(Continued)

*Primary Examiner* — Andrew W Johns
(74) *Attorney, Agent, or Firm* — Lindauer Law, PLLC

(57) ABSTRACT

Objects in a facility, such as users or totes, may be tracked as the object moves within the facility. An object representation of the object may be detected using image data. Apparent motion of the object representation may also be detected based on changes within the image data over time, which can help determine movement data for the object representation. However, the identity of the object representation may not be known. Using data from motion sensors in a device, movement data for the device can be generated. Thereafter, the movement data determined using the image data and the movement data determined using the data from the motion sensors in the device are compared for a possible match. If a match is found, an identifier of the device may then be associated with the object representation in the image data for tracking purposes.

20 Claims, 10 Drawing Sheets

(51) Int. Cl.
 *G06Q 10/08* (2012.01)
 *H04W 4/02* (2018.01)
 *G06K 9/32* (2006.01)

(52) U.S. Cl.
 CPC .............. *G06K 9/3241* (2013.01); *G06T 7/20* (2013.01); *H04W 4/027* (2013.01)

(58) Field of Classification Search
 CPC ....... H04W 4/025; H04W 4/027; H04W 4/04; H04W 4/33; H04W 4/35
 See application file for complete search history.

(56) References Cited

U.S. PATENT DOCUMENTS

| | | | |
|---|---|---|---|
| 7,949,568 B2 | 5/2011 | Fano et al. | 705/22 |
| 8,009,864 B2 | 8/2011 | Linaker et al. | 382/100 |
| 8,189,855 B2 | 5/2012 | Opalach et al. | 382/100 |
| 8,630,924 B2 | 1/2014 | Groenevelt et al. | 705/28 |
| 9,235,928 B2 | 1/2016 | Medioni et al. | G06T 17/00 |
| 9,473,747 B2 | 10/2016 | Kobres et al. | H04N 7/181 |
| 9,723,693 B1 | 8/2017 | Megginson et al. | H05B 37/0227 |
| 10,515,337 B1 * | 12/2019 | Niranjayan et al. | G06Q 10/087 |
| 2011/0011936 A1 | 1/2011 | Morandi et al. | 235/454 |
| 2012/0284132 A1 | 11/2012 | Kim et al. | 705/20 |
| 2013/0284806 A1 | 10/2013 | Margalit | G06Q 30/06 |
| 2014/0193040 A1 | 7/2014 | Bronshtein | G06T 7/246 |
| 2015/0085111 A1 | 3/2015 | Lavery | H04N 21/21805 |
| 2015/0086107 A1 | 3/2015 | Dedeoglu et al. | G06K 9/00201 |
| 2017/0308757 A1 | 10/2017 | Nguyen et al. | H04W 4/02 |
| 2019/0080157 A1 | 3/2019 | Lev et al. | 9/342 |

OTHER PUBLICATIONS

Johns, Andrew W., "Notice of Allowance dated Aug. 5, 2019", U.S. Appl. No. 15/799,780, The United States Patent and Trademark Office, Aug. 5, 2019.

Johns, Andrew W., "Non-final Office Action dated Apr. 11, 2019", U.S. Appl. No. 15/799,780, The United States Patent and Trademark Office, Apr. 11, 2019.

Kalnikaite, et al., "How to Nudge In Situ: Designing Lambent Devices to Deliver Information Salience in Supermarkets", ACM, In proceeding of: UbiComp 2011:Ubiquitous Computing, 13th International Conference, UbiComp 2011, Beijing, China, Sep. 17-21, 2011, 10 pages. Retrieved from the Internet: http://www.researchgate.net/publication/221568350_How_to_nudge_in_Situ_designing_lambent_devices_to_deliver_salient_information_in_supermarkets.

NXP Semiconductors, "6-Axis Sensor With Integrated Linear Accelerometer and Magnetometer", FXOS8700CQ, Rev. 7.0, Mar. 22, 2016, 117 pages.

Pop, Cristian, "Introduction to the BodyCom Technology" AN1391, DS01391A, Microchip Technology, Inc., May 2, 2011, 26 pages. Retrieved from the Internet: http://www.microchip.com//wwwAppNotes/AppNotes.aspx?appnote=en555156.

Stmicroelectronics, "iNEMO Inertial Module: Always-on 3D Accelerometer and 3D Gyroscope", LSM6DSM, DocID028165 Rev. 7, Sep. 2017, 126 pages.

Stmicroelectronics, "LSM6DSM: Always-on 3D Accelerometer and 3D Gyroscope", AN4987 Application note, DocID030170 Rev. 3, Jun. 2017; 132 pages.

Vu, et al., "Distinguishing Users with Capacitive Touch Communication", WINLAB, Rutgers University, In proceedings of: The 18th Annual International Conference on Mobile Computing and Networking ('MobiCom '12), Istanbul, Turkey, Aug. 22-26, 2012, 12 pages.

\* cited by examiner

300

OBJECT REPRESENTATION MOVEMENT DATA 128

OR ID 302 "005"

| TIMESTAMP 304 | MOVEMENT TYPE 306 |
|---|---|
| 13 | STOPPED |
| 16 | MOVING |
| 19 | STOPPED |
| 32 | MOVING |

OR ID 302 "006"

| TIMESTAMP 304 | MOVEMENT TYPE 306 |
|---|---|
| 4 | STOPPED |
| 5 | MOVING |
| 15 | STOPPED |
| 17 | MOVING |

OR ID 302 "007"

| TIMESTAMP 304 | MOVEMENT TYPE 306 |
|---|---|
| 14 | STOPPED |
| 24 | MOVING |
| 28 | STOPPED |
| 35 | MOVING |

DEVICE MOVEMENT DATA 138

DEVICE ID 132 "0717"

| TIMESTAMP 304 | MOVEMENT TYPE 306 |
|---|---|
| 14 | STOPPED |
| 15 | MOVING |
| 18 | STOPPED |
| 31 | MOVING |

DEVICE ID 132 "1492"

| TIMESTAMP 304 | MOVEMENT TYPE 306 |
|---|---|
| 3 | STOPPED |
| 5 | MOVING |
| 16 | STOPPED |
| 18 | MOVING |

DEVICE ID 132 "5210"

| TIMESTAMP 304 | MOVEMENT TYPE 306 |
|---|---|
| 15 | STOPPED |
| 25 | MOVING |
| 29 | STOPPED |
| 36 | MOVING |

DEVICE ASSOCIATION DATA 146

| DEVICE ID 132 | USER IDENTIFIER 148 |
|---|---|
| 0717 | 5487 |
| 1492 | 3329 |
| 5210 | 7448 |
| 5210 | 6441 |

FIG. 3

SYSTEM AND METHOD FOR TRACKING OBJECTS WITHIN A FACILITY

This application is a continuation of, and claims priority to, pending U.S. patent application Ser. No. 15/799,780 filed on Oct. 31, 2017, entitled "User Identification System." The entirety of this previously filed application is hereby incorporated by reference.

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas (e.g., shopping area), and customers can pick items from inventory and take them to a cashier for purchase, rental, and so forth. Many of those physical stores also maintain inventory in a storage area, fulfillment center, or other facility that can be used to replenish inventory located in the shopping area or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor the entry of users into the facility and movement of inventory, users, and other objects within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 depicts diagrams of object representation movement data, device movement data, and device association data, according to some implementations.

Figure 1:
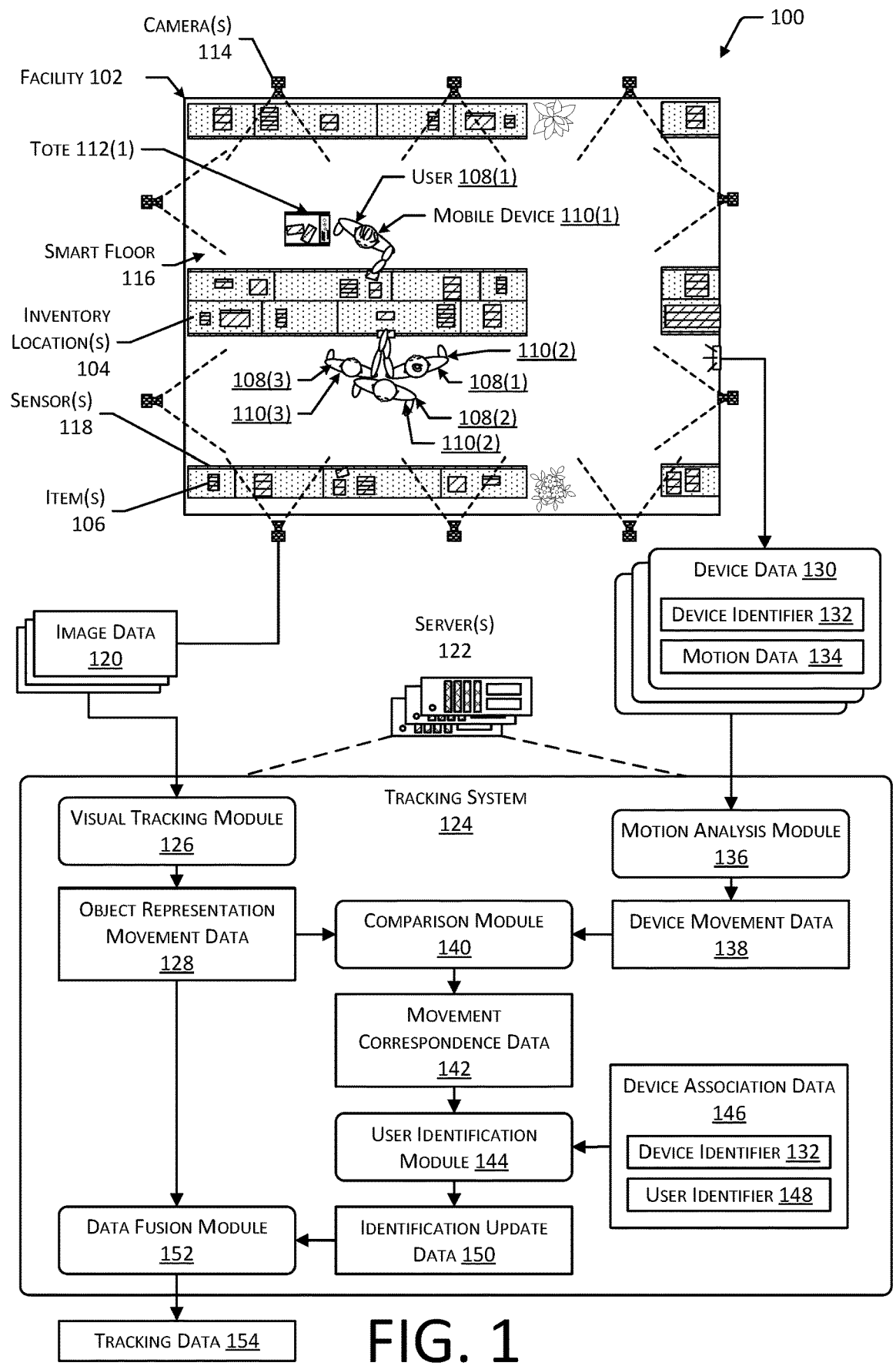
FIG. 1 illustrates a system to identify users at a facility, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to".

DETAILED DESCRIPTION

This disclosure describes systems and techniques for associating a user identifier with an object representation or "blob" that is being tracked in a facility using a tracking system. The tracking system is designed to provide tracking data that may be indicative of the whereabouts and identity of users in the facility at particular times.

The tracking system may include a visual tracking module that uses image data comprising a plurality of images obtained from cameras at the facility. A user of the facility may be depicted in some of those images. The visual tracking module may determine the presence of an object representation in an image. The object representation may comprise a region of an image that differs from other regions. The object representation may be a region of pixels that are associated with the user, such as showing the user's head, shoulders, and perhaps other objects such as clothing or something they are carrying. The object representation may be identified based on a difference in one or more of color, contrast, distance, and so forth. For example, if the floor is a particular shade of green, the object representation may be described as a region of pixels that are surrounded by that particular shade of green. In another example, if the image data includes distance or depth information, the object representation may comprise a region of pixels that are indicative of an object that is above a threshold level from the floor.

The visual tracking module may use object representation tracking techniques. For example, the visual tracking module may use the apparent motion of the object representation from one image to another to determine that the user has moved from one location to another in the facility. Given a known location of the cameras, time data that indicates the elapsed time between images, and so forth, object representation movement data may be generated. The object representation movement data is indicative of the movement of the object depicted by the object representation. For example, the object representation movement data may include information about heading, acceleration, velocity, location, and so forth of the user at various times.

Object representation tracking allows the visual tracking module to determine where the user is, but may not provide information about the identity of the user. For example, two different users wearing the same uniform and hats may not be readily distinguishable from one another. A user may be identified using various techniques, such as presenting credentials at an entry portal, facial recognition, and so forth. Once identified, a user identifier that is indicative of that particular user may be associated with the object representation.

As the object representation moves around the facility, the user identifier may stay associated with the object representation. However, in some situations this association may fail. For example, object representation tracking may fail, leading to a loss of that association between object representation and user identifier. As a result, the identity of the user represented by the object representation may be lost. For example, several users may crowd together in a small area, resulting in their object representations merging. In another example, a failed camera may result in a gap in the image data, resulting in a discontinuity in the available data and a loss of identity for the object representations after they reappear in the image data after the gap.

Described are techniques and devices that allow an identity of an object representation to be determined. The user identifier for that identity may be associated with a particular object representation, may be used to confirm an existing user identifier, and so forth. The technique utilizes a comparison between information about the movement as obtained by the visual tracking module and device movement data obtained from inertial sensors from a mobile device carried by the user, such as a smartphone.

As described above, object representation movement data is produced by the visual tracking module. In one implementation, the object representation movement data may comprise a time series that includes timestamps and information about movement types. For example, the movement type may be "stopped" indicating the user is not moving, "moving" indicating the user is moving, "turning" indicating the user is turning, and so forth. The time of a transition between these states may be indicated by the timestamp. This object representation movement data may be considered a signature or pattern that shows when the object representation was stopped or was moving at different times.

As mentioned, the user may be carrying a mobile device. The mobile device may comprise a tablet, smartphone, smart watch, fitness tracker, and so forth. The mobile device includes one or more motion sensors. For example, the mobile device may include an inertial measurement unit (IMU) that has three accelerometers to detect acceleration along mutually orthogonal axes, and three gyroscopes to detect rotation about those axes. Motion data is generated by the motion sensors. This motion data may then be processed to determine device movement data. The device movement data may comprise a time series that includes timestamps and information about movement types. For example, a motion analysis module may process the motion data to determine when the mobile device, and thus the user that is carrying the mobile device, is moving, standing still, turning, and so forth. The time of transitions between states such as "stopped", "moving", "turning" and so forth may be indicated.

The device movement data provides a signature showing when the mobile device was stopped or moving. The device movement data may include or be otherwise associated with a device identifier that is representative of that particular mobile device. For example, the device identifier may comprise a media access control (MAC) address, a serial number, and so forth.

The object representation movement data and the device movement data may be compared to one another. As users move about the facility, they move in different patterns, stopping and starting their movement at different times. As a result, between a first time and a second time, the pattern of a first user's movement may become distinctive compared to a second user's movement. To determine the identity of an object representation, the object representation movement data and the device movement data are compared with one another. If the object representation movement data and the device movement data describe the same types of movement occurring within a threshold value of the same times, the two may be deemed to match. For example, the object representation movement data for a first object representation may show that the object representation was stopped at time 13, moving at time 16, and stopped again at time 19. Continuing the example, the device movement data for a first mobile device may show the mobile device was stopped at time 14, moving at time 15, and stopped again at time 18. If the threshold time value is 2, then the pattern of motion of the object representation and the mobile device may be deemed to match.

This match results in an association between the object representation and the mobile device. The device movement data includes or is associated with a device identifier that is representative of the particular mobile device that acquired the motion data used to create the device movement data. The device identifier may be used to retrieve a user identifier that was previously associated with that device. For example, a device association data table may associate particular device identifiers with particular user identifiers.

The user identifier that is associated with the mobile device which provided the matching device movement data may then be associated with the object representation having the matching object representation movement data. For example, if the mobile device is associated with user identifier "5487", then this user identifier may be associated with the object representation having the matching object representation movement data. The user identifier associated with the object representation is now known.

In other implementations, other techniques may be used. For example, the visual tracking module may generate object representation movement data indicative of an actual trajectory. The actual trajectory may include information such as heading and acceleration of the object representation between a first time and a second time. A motion analysis module may process the motion data from the mobile device to produce device movement data that is indicative of an estimated trajectory. The actual trajectory and the estimated trajectory may be compared. If the estimated trajectory corresponds to the actual trajectory within a threshold value, then the two may be deemed to match. In another implementation, the endpoints of the respective trajectories may be compared. For example, an actual starting point and actual ending point of the object representation may be determined by the visual tracking module. Continuing the example, the actual starting point may be used as a starting point for the estimated trajectory, and an estimated ending point may be determined. If the actual ending point and the estimated ending point are within a threshold distance of one another, the actual trajectory and the estimated trajectory may be deemed to match.

In other implementations, other objects may be tracked and have their identities resolved. For example, a tote moving within the facility may be tracked using object representation tracking and may include a mobile device that provides the device movement data. The tracking system may use the information described above to produce tracking data that indicates where a particular tote was in the facility at a particular time.

The facility may include, or have access to, an inventory management system. The inventory management system may be configured to maintain information about items, users, condition of the facility, and so forth. For example, the inventory management system may maintain data indicative of what items a particular user is ordered to pick, location of the particular user, availability of a user providing support services to others, requests for assistance, environmental status of the facility, and so forth. The inventory management system, or another system, may generate this data based on sensor data, such as the image data obtained by the cameras.

During operation, the facility may include, or have access to, the tracking data. The tracking data may be used by an inventory management system to associate particular interactions such as the pick or place of items from an inventory location with a particular account. For example, tracking data may indicate that user 5487 was adjacent to inventory location 9371001 at time 13. Weight data indicative of a change in weight at inventory location 9371001 at time 13 may indicate a pick of a quantity of one of item 753394130. Given the proximity of user 5487 to the inventory location 9371001 at the time of the pick, user 5487's account may be billed for a quantity of one of item 753394130. As a result, the overall operation of the facility and the user experience may be improved.

The techniques described herein also allow for a more computationally efficient determination of identity. For example, the computational complexity of the comparison between the object representation movement data and the device movement data is significantly less than computational complexity associated with image recognition techniques. Continuing the example, it requires fewer computational resources to compare the object representation movement data with the device movement data than to determine characteristics of objects such as a face in an image, and compare those characteristics with previously stored data to attempt to determine the identity of the user.

In other implementations a combination of the techniques described herein may be utilized. For example, in some situations the mobile device may be associated with a set of possible user identifiers. Continuing the example, two adults may share a single smartphone. The system as described above may determine that the object representation is associated with this set of possible user identifiers. Further determinations may be made to disambiguate between the possible user identifiers in the set of possible user identifiers. For example, facial recognition techniques may be used to disambiguate between the set of possible user identifiers. By limiting facial recognition processing to assessing the faces in the image data to the relatively small set of possible user identifiers, computational demands are significantly reduced compared to determining identity across all possible users of the facility. Time to perform such comparisons is also significantly reduced. In another example, gait recognition, data from weight sensors in the floor, and so forth may be used to determine a particular user identifier from the set of possible user identifiers. As above, by limiting the comparison to the relatively small set of possible user identifiers reduces the time and computational resources needed to make such determinations. As a result, the techniques described in this disclosure improve the performance of the tracking system.

Illustrative System

FIG. 1 illustrates a system 100 to identify users at a facility, according to some implementations. A facility 102 may comprise a material handling facility, retail store, library, hospital, commercial space, residence, and so forth. The facility 102 may include one or more inventory locations 104. The inventory locations 104 may include one or more of a shelf, a rack, a case, a cabinet, a bin, a floor location, or other suitable storage mechanisms for holding, supporting, or storing items 106.

A user 108 may move about the facility 102. For example, a user 108 may enter the facility 102 to acquire items 106 for purchase. The user 108 may have in their possession a mobile device 110. The mobile device 110 may comprise one or more of a smartphone, wearable computer, badge, fitness tracker, and so forth. For example, the mobile device 110 may comprise a badge issued to employees of the facility 102. The mobile device 110 may include a radio. The radio may comprise one or more of a transmitter or receiver suitable for sending and receiving signals. The signal may be used to convey information. For example, the radio may be part of a wireless network communication interface that is compatible with one or more of Bluetooth, Wi-Fi, and so forth.

One or more totes 112 may be present in the facility 102. The tote 112 is configured to carry or otherwise transport one or more items 106. For example, the tote 112 may include a basket, cart, bag, bin, and so forth. During operation of the facility 102, users 108, robots, and so forth may pick items 106 from the inventory locations 104 and place them into totes 112, pick items 106 from the totes 112 and return them to inventory locations 104, and so forth.

Cameras 114 may be arranged throughout the facility 102. For example, cameras 114 may be mounted overhead in the facility 102, with their respective fields-of-view looking down. In another example, cameras 114 may be mounted at inventory locations 104, on totes 112, and so forth. The cameras 114 are configured to detect light in one or more wavelengths including, but not limited to, terahertz, infrared, visible, ultraviolet, and so forth. The cameras 114 may comprise charge coupled devices (CCD), complementary metal oxide semiconductor (CMOS) devices, microbolometers, and so forth.

The facility 102 may include a smart floor 116 that is able to provide information about the location of objects, such as users 108, totes 112, and so forth. For example, the smart floor 116 may comprise sensing elements, or segments. Each segment may include an antenna that is coupled to one or more of a transmitter or a receiver. During operation, the segment may transmit an electromagnetic signal that is radiated by the antenna, receive an electromagnetic signal that is acquired by the antenna, or both. In some implementations the smart floor may operate as a physically large touch sensor that is deployed at floor level. The electromagnetic signals provide information about the presence of an object thereon. For example, the segments may electromagnetically couple to objects that are close by, allowing for the detection of objects that are either in contact with the floor or above the floor. In some implementations, instead of or in addition to the visual tracking of the object, the smart floor 116 may be used to provide object representation movement data 128 as described below. For example, the output from the segments obtained during a particular window of time may be processed in a fashion similar to the image data 120.

Other sensors 118 may be present in the facility. For example, weight sensors may provide information about the weight of items 106 at the inventory locations 104. Weight data and information about changes in weight may be used to determine a count of items 106 at an inventory location 104, determine what items 106 have been picked or placed, and so forth.

The cameras 114 may provide image data 120 to one or more servers 122 that provide a tracking system 124. For example, the cameras 114 may send the image data 120 to the one or more servers 122 using a network. The image data 120 may comprise still images, video, and so forth. For example, the image data 120 may comprise a plurality of images, acquired at particular times. The image data 120 may include timestamps, time indices, or other indicia that are representative of when a particular image was acquired. For example, each image in the image data 120 may include a timestamp that is indicative of clock time.

The tracking system 124 may include a visual tracking module 126. The visual tracking module 126 processes at least a portion of the image data 120 to determine the presence of one or more object representations (or "blobs"). An object representation may comprise a region of an image that differs from other regions. The object representation may be identified based on a difference in one or more of color, contrast, distance, and so forth. For example, if the floor is a particular shade of green, the object representation may be described as a region of pixels that are surrounded by that particular shade of green. In another example, if the image data 120 includes distance or depth information, the object representation may comprise a region of pixels that are indicative of an object that is above a threshold level from the floor.

During operation of the visual tracking module 126, the object representation may be a region of pixels that are associated with an object, such as the user 108, the tote 112, and so forth. For example, in the case of the user 108, the object representation of a single user may include the pixels that are representative of the user's head, shoulders, and perhaps other objects such as clothing or something the user 108 is carrying.

The visual tracking module 126 may generate object representation movement data 128 that is indicative of movement of the object representation at different times. For example, the object representation movement data 128 may be indicative of one or more of a particular location of an object representation within the facility 102, velocity, acceleration, heading or direction of travel, rotation, and so forth. In one implementation, the object representation movement data 128 may comprise information that is indicative of events such as movement types or state at particular times. These movement types may include, but are not limited to, "stopped", "moving", "turning", "turning left", "turning right", and so forth. For example, the object representation movement data 128 may indicate a first event that at time=13 the object representation was stopped, a second event that at time=16 the object representation was moving, and so forth. The object representation movement data 128 is discussed in more detail with regard to FIG. 3.

The visual tracking module 126 may use object representation tracking techniques to generate the object representation movement data 128. For example, the visual tracking module 126 may use the apparent motion of the object representation from one image to another to determine that the user has moved from a first location to a second location within the facility 102. Given a known location of the cameras 114, time data that indicates the elapsed time between images, and so forth, information about the movement of the object representation may be calculated. For example, the object representation may comprise a first region within a first image that is acquired at a first time. For example, the first region may appear as an overhead view of the object representation. A first location of the object representation may be determined in the first image acquired at a first time. The first location may be indicative of a point in space within the facility 102 with respect to a predetermined coordinate system. For example, the predetermined coordinate system may specify a two-dimensional plane with respect to pixels in the image data 120. In another example, the predetermined coordinate system may specify coordinates with respect to physical axes, such as 27.3 meters along an X axis and 3.2 meters along a Y axis that is laid out on a floor of the facility. A second image acquired at a second time after the first time may be processed and a second location of the object representation in the second image may be determined. Based on the first location and the second location, a displacement distance of the object representation may be calculated. For example, the displacement distance may be indicative of 0.35 meter. Based on a comparison of the displacement distance to a threshold value, a movement type may be determined. For example, a displacement distance of less than 0.05 meter may be associated with a movement type of "stopped" while a displacement distance greater than 0.05 meter is determined to be "moving".

The object representation movement data 128 may also be indicative of a rotation of the object that is depicted by the object representation. For example, the visual tracking module 126 may determine a major axis of the object representation in a first image that was acquired at a first time. A first orientation of the major axis at the first time may be determined. For example, the first orientation may be with respect to an arbitrary coordinate system, such as rows and columns of pixels in an image, or with respect to an external coordinate system such as north/south/east/west. Continuing the example, the visual tracking module 126 may determine a major axis of the object representation in a second image that was acquired at a second time. A second orientation of the major axis at the second time may be determined. The first orientation and the second orientation may be described with respect to the same coordinate system. Rotation of the object being tracked by the visual tracking module 126 may be determined when the first orientation and the second orientation differ by greater than a threshold value. In some implementations, information about the difference may be used to determine if the rotation was clockwise or counterclockwise, magnitude of the rotation, and so forth. The object representation movement data 128 may thus be generated that is indicative of a rotation.

The visual tracking module 126 may be unable to determine the identity of a user 108 based on the appearance of their associated object representation. For example, user 108(1) and user 108(2) may both be wearing the same uniforms, hats, and safety gear that obscures their faces such as respirators and face shields. As a result, the object representations of these users 108 are not readily distinguishable and do not provide enough information to identify a user 108 on the basis of appearance alone.

Identity may be associated with an object representation in various ways. For example, when the user 108 enters the facility 102 they may present credentials such as an identification token, may have an image of their face processed using facial recognition techniques, may provide a fingerprint to a fingerprint sensor, and so forth. Once identified, a user identifier that is indicative of that particular user's identity may be associated with the object representation.

As the object representation moves around the facility 102, the user identifier may stay associated with the object representation. However, in some situations this association between the user identifier and an object representation may be lost. For example, image data 120 may be lost due to a network problem or camera failure. This produces a gap into which object representations with known identities enter and from which unknown identities emerge. In another example, object representations may merge, resulting in a loss of identity. For example, several users 108 may crowd together in a small area, resulting in their object representations merging. In another example, two users 108 may hug, resulting in a merger of their object representations. When those users 108 move apart and go their separate ways, the visual tracking module 126 is able to track their respective object representations, but may not be able to assert a user identifier with a particular object representation.

As described above, the object representation tracking used by the visual tracking module 126 allows the tracking system 124 to quickly determine where an object representation that is representative of a user 108 is at various times, and provide information about their movement, but may not be able to provide information about the identity of the user 108.

As described above, users 108 may be carrying a mobile device 110. Mobile devices 110 may be carried by totes 112 or other objects which the tracking system 124 is to track. The mobile device 110 may include one or more motion sensors that provide information indicative of movement. For example, the motion sensors may include one or more accelerometers, gyroscopes, and so forth. In one implementation, the sensors may comprise an inertial measurement unit (IMU) that includes three accelerometers that sense acceleration along one of three mutually orthogonal axes and three gyroscopes that sense rotation about each of the axes. For example, the IMU may comprise an LSM6DSM from STMicroelectronics of Geneva, Switzerland that provides three-axis digital accelerometers and three-axis digital gyroscopes. The LSM6DSM may provide output data that is indicative of measured accelerations and rotations at given sample times. For example, the LSM6DSM may provide motion data 134 that comprises 16 bit values from the following registers:

OUTX_H_XL most significant part of linear acceleration along the X axis
OUTX_L_XL least significant part of linear acceleration along the X axis
OUTY_H_XL most significant part of linear acceleration along the Y axis
OUTY_L_XL least significant part of linear acceleration along the Y axis
OUTZ_H_XL most significant part of linear acceleration along the Z axis
OUTZ_L_XL least significant part of linear acceleration along the Z axis
OUTX_H_G most significant part of rotation about the X axis
OUTX_L_G least significant part of rotation about the X axis
OUTY_H_G most significant part of rotation about the Y axis
OUTY_L_G least significant part of rotation about the Y axis
OUTZ_H_G most significant part of rotation about the Z axis
OUTZ_L_G least significant part of rotation about the Z axis Example Motion Data During operation, the mobile device 110 may send device data 130 to the tracking system 124. The device data 130 may include a device identifier (device ID) 132 and motion data 134. The device ID 132 provides information that identifies the particular mobile device 110. For example, the device ID 132 may include a media access control (MAC) address, a serial number, and so forth.

The motion data 134 comprises information obtained from the motion sensors, as well as data indicative of time. For example, the motion data 134 may comprise a serialized stream of data from the accelerometers indicating acceleration values for particular axes and timestamps associated with those acceleration values.

The device data 130 may be provided to the tracking system 124. For example, the mobile devices 110 may send the device data 130 to the one or more servers 122 using a wireless network.

The tracking system 124 may include a motion analysis module 136. The motion analysis module 136 processes the device data 130 to produce device movement data 138. The device movement data 138 may comprise information that is representative of events such as a movement types or states at particular times. These movement types may include, but are not limited to, "stopped", "moving", "turning", "turning left", "turning right", and so forth. For example, the device movement data 138 may be indicative of the mobile device 110 exhibiting a first event of a movement type of "stopped" at time=14, a second event of a movement type of "moving" at time=15, and so forth. The device movement data 138 is discussed in more detail with regard to FIG. 3. In some implementations the mobile device 110 may produce the device movement data 138. For example, the IMU may perform one or more functions of the motion analysis module 136, and may produce as output device movement data 138. For example, the step detector function of the LSM6DSM may be used to generate device movement data 138 that indicates timestamped data of when a step of the user 108 has taken place. In another implementation, the significant movement function of the LSM6DSM may be used to generate timestamped data indicative of when motion exceeds a threshold value.

Movement creates changes in the motion data 134 that are detectable. For example, a footstep involves impulse energy that is absorbed by the body of the user 108. This impulse produces noticeably large measurements in the accelerometer data of the motion data 134. These large measurements occur regardless of the particular placement of the mobile device 110 on the user 108. For example, spikes in acceleration are detectable whether the mobile device 110 is carried in a back pocket, shirt pocket, and so forth. The acceleration may be diminished in amplitude somewhat when the mobile device 110 is being carried in hand or within a handbag, but the impulse remains detectable. Similarly, changes in rotation as measured by gyroscopes provide information about whether the mobile device 110 is moving or stopped.

Motion data 134 from one or more of the accelerometers or gyroscopes may also be used to determine if the mobile device 110 is turning. In some situations, a direction of the turn may be determined. For example, gyroscope data may indicate a movement type of "turning right". In one implementation, the direction of local vertical that is aligned with a local gravity vector due to gravity may be determined.

Transforms may be used to convert the axes of the sensors such that at least one is aligned with local vertical. Once aligned, a direction of a turn may be determined, such as "turning left" or "turning right".

The motion data 134 may be processed to determine changes in state of motion, such as stop events when the mobile device 110 has come to a relative halt and movement events at which the mobile device 110 is in motion again.

A stop event does not necessarily indicate a complete cessation of motion of the mobile device 110. For example, the stop event may indicate that the mobile device 110, and the user 108 carrying the mobile device, are no longer in motion. But the mobile device 110 may be moved somewhat as the user 108 shifts their stance, reaches for items 106, breathes, and so forth.

In one implementation, the motion data 134 may comprise an IMU with six degrees of freedom (DOF). For example, the IMU may comprise three accelerometers, each accelerometer sensitive to acceleration along one of three mutually orthogonal axes. Likewise, the IMU may include three gyroscopes, each gyroscope sensitive to rotation about one of the three mutually orthogonal axes. The output from the IMU may be characterized as linear acceleration values expressing linear acceleration data along the x, y, z axes from the accelerometers and three rotational values expressing rotation about each of the x, y, and z axes.

A motion score may be calculated using data from each axis. For example, a motion score at a given time may be calculated for each of the three linear values and the three rotational values. The motion score may comprise a variance in the value from a first time at a beginning of a sample window and a second time at an end of the sample window. In one implementation the sample window may be 250 milliseconds (ms) in duration. As time proceeds, the sample window is moved, sample by sample. As a result, a set of variances of the motion score for that axis is determined. This set of variances may be described as a curve. In one implementation, the variance values may be compared to a threshold value to determine if the mobile device is stationary or in motion.

In another implementation, a probability model may be used to produce hypotheses scores for a particular time index given a particular motion score. The hypothesis score describes, for a particular interval or window of time, the probability that the mobile device 110 is in motion, using the data from one of the axes represented by the motion data 134. For example, the hypothesis score may indicate a probability of between 0 and 1 that the linear acceleration data along axis xis indicative of the mobile device 110 moving. In some implementations, a Gaussian probability model may be used.

The hypothesis scores for different axes, such as the three linear axes and the three rotational axes, may be calculated. Once calculated, the hypothesis scores for the various axes may be combined to produce an overall hypothesis score. For example, the overall hypothesis score may indicate a probability that the user is stopped or moving.

The following code example describes one implementation of an algorithm to determine that a change in motion, such as indicative of a change between movement types, has taken place. In other implementations, other algorithms may be used.

```
function [t_stamps,ss ] = CompCD(t,xin,n_win)
%% Change detection
%% algorithm to determine change detection on signals from
accelerometer, gyroscopes, etc.
%xin = Y_M_iir(:,5); n_win=0.5*fs;
ss = [ ];k1=1; % ss = stability score
tb0 =1; tb1=n_win; ta0=1;ta1=1; % tb − before stable period;
ta after stable period
cumAvg = 0;
cumAvgM = [0,0,0,0,0];
W_levels = [ ];
W_levels_sh =[ ];
change=[ ];
changeM =[ ];
startW =[ ];
endW = [ ];
t_stamps = [ ];
State = 0; % sensor's current state 0-stable 1-unstable
rms_stable =5; % threshold of stability score to accept a
level is stable
%w_det_th = 20; % minimum change that will be detected
for i=1:(length(xin)-n_win)
    x = xin(i:i+n_win-1);
    ss = [ss sqrt(var(x))];
    if State == 0
        if sqrt(var(x))<rms_stable
            tb1 = i+n_win-1;
            W_rep(k1) = mean(x);
            cumAvg = (cumAvg*(tb1-tb0) + x(end))/(tb1-tb0+1);
            % cumAvgM = (cumAvgM*(tb1-tb0) + Y_M_iir(i+n_win-1,:))/
(tb1-tb0+1);
            k1=k1+1;
        else
            W_levels = [W_levels cumAvg];
            tb0, tb1
            t_stamps = [t_stamps [tb0;tb1]];
%           R = xcorr(xin(tb0:tb1)-
mean(xin(tb0:tb1)),xin(tb0:tb1)-mean(xin(tb0:tb1)));
%           figure(9); hold on ;plot(R);
            State =1;
        end
    elseif State ==1
        if sqrt(var(x))<rms_stable
            tb0 = i;
            tb1 = i+n_win-1;
            %t_stamps = [t_stamps [tb0;tb1]];
            W_levels_sh = [W_levels_sh mean(x)]; % short time
window average
            change = [change, cumAvg-mean(x)];
            % changeM = [changeM; cumAvgM-
mean(Y_M_iir(i:i+n_win-1,:))];
            startW = [startW; cumAvgM];
            %endW = [endW; mean(Y_M_iir(i:i+n_win-1,:))];
            cumAvg = mean(x);
            %cumAvgM = mean(Y_M_iir(i:i+n_win-1,:));
            %k1=k1+1;
            State =0;
        else
            3;
        end
    end
end
t_stamps = [t_stamps [tb0;tb1]];
t_stamps=t_stamps';
end
```

Code Example 1

In some implementations, a low pass filter may be applied to the motion data 134 to produce filtered data, which may then be processed as described above. For example, motions having frequencies above 300 Hz may be removed by the low pass filter.

In other implementations, the motion analysis module 136 may be implemented at least in part on the mobile device 110. For example, the mobile device 110 may process the device data 130 and generate device movement data 138 that is then sent to the tracking system 124.

The motion analysis module 136 may use other techniques to determine the device movement data 138. For example, other algorithms may be used to process the motion data 134 to generate the device movement data 138.

The tracking system 124 may include a comparison module 140 that compares at least a portion of the object representation movement data 128 for one or more object representations with at least a portion of the device movement data 138 from one or more mobile devices 110. The comparison module 140 may produce as output movement correspondence data 142. The movement correspondence data 142 is indicative of whether the movement of the object representation corresponds to the movement of the mobile device 110. In one implementation the movement correspondence data 142 may comprise a binary value, such as a 0 for no correspondence and a 1 for a match. In another implementation the movement correspondence data 142 may comprise a confidence value that indicates a probability that the movement of the object representation matches the movement of the mobile device 110. The movement correspondence data 142 may include an object representation identifier (object representation ID) that is indicative of a particular object representation that is being tracked by the visual tracking module 126 and the device ID 132 of the mobile device 110 that provided the motion data 134.

The comparison module 140 may use various techniques to improve performance, reduce the amount of data being processed, and so forth. In one implementation, the comparison module 140 may use historical tracking data to generate a candidate set of user identifiers. For example, the candidate set of user identifiers may comprise those user identifiers who were previously known to be in the facility 102 and are, at a particular time such as the present, currently unassociated with any object representations. In another example, the candidate set of user identifiers may comprise the user identifiers that were within a threshold distance of a location associated with an unidentified object representation at a given time. In yet another example, the candidate set of user identifiers may comprise the user identifiers that are deemed to have entered the facility 102, and have not exited. In still another example, the candidate set of user identifiers may comprise all user identifiers for users deemed to be within the facility 102 that are unassociated with an object representation.

The comparison module 140 may synchronize the object representation movement data 128 and the device movement data 138 to allow the comparison of the respective movements at common times. In one implementation, the comparison module 140 may apply a correction factor to the timestamps of events indicated in one or more of the object representation movement data 128 or the device movement data 138.

In some implementations, the synchronization may be performed based on the correlation of the object representation movement data 128 and the device movement data 138. For example, if the extent of correlation between object representation movement data 128 and the device movement data 138 exceeds a threshold amount, the two may be deemed to represent the same section of time.

The comparison module 140 may compare events in the object representation movement data 128 and the device movement data 138 to determine if there is a correspondence that exceeds a threshold value. For example, a particular sequence of events describing particular movement types at various times in the object representation movement data 128 may match those in the device movement data 138. The comparison is discussed in more detail with regard to FIG. 4.

When the movement correspondence data 142 is indicative of a match, the movement correspondence data 142 may be provided to a user identification module 144. For example, the movement correspondence data 142 may be indicative of an object representation identifier and a corresponding device ID 132.

The user identification module 144 accesses device association data 146. The device association data 146 associates device IDs 132 with user identifiers (user ID) 148. For example, a particular user ID 148 may be associated with the device ID 132 of a particular mobile device 110. The device association data 146 is described in more detail with regard to FIG. 3.

The user identification module 144 uses the device association data 146 to determine identification update data 150 that asserts a particular user ID 148 with a particular object representation. For example, the user identification module 144 uses the device ID 132 from the movement correspondence data 142 to find the corresponding user ID 148 in the device association data 146. Once found, that user ID 148 may be asserted to the particular object representation.

The identification update data 150 may comprise data such as a user ID 148 and an object representation identifier. In some implementations the identification update data 150 may include one or more of a timestamp indicative of when the identity is deemed to be valid, a confidence value indicative of likelihood that the identity asserted is correct, and so forth.

The identification update data 150 may be provided to a data fusion module 152. The data fusion module 152 uses the identification update data 150 to assert the user ID 148 in the identification update data 150 with the particular object representation. For example, the user ID 148 with a value of "5487" may be asserted to object representation ID "005".

Once the identity has been asserted, the tracking system 124 may produce tracking data 154. The tracking data 154 may comprise information such as the location of the user 108 at particular times, movement patterns, and so forth. The assertion of identity may be retroactive in some situations. For example, an unidentified object representation may be tracked for some time, and after device data 130 has been acquired the user ID 148 may be asserted as described above. As a result, the previously unidentified tracking data 154 may be retroactively designated as associated with the user ID 148.

The tracking data 154 may be used by an inventory management system. For example, the inventory management system may use tracking data 154 to determine the identity of a user 108 who has picked an item 106 from an inventory location 104. The inventory management system is described below in more detail.

Figure 2:
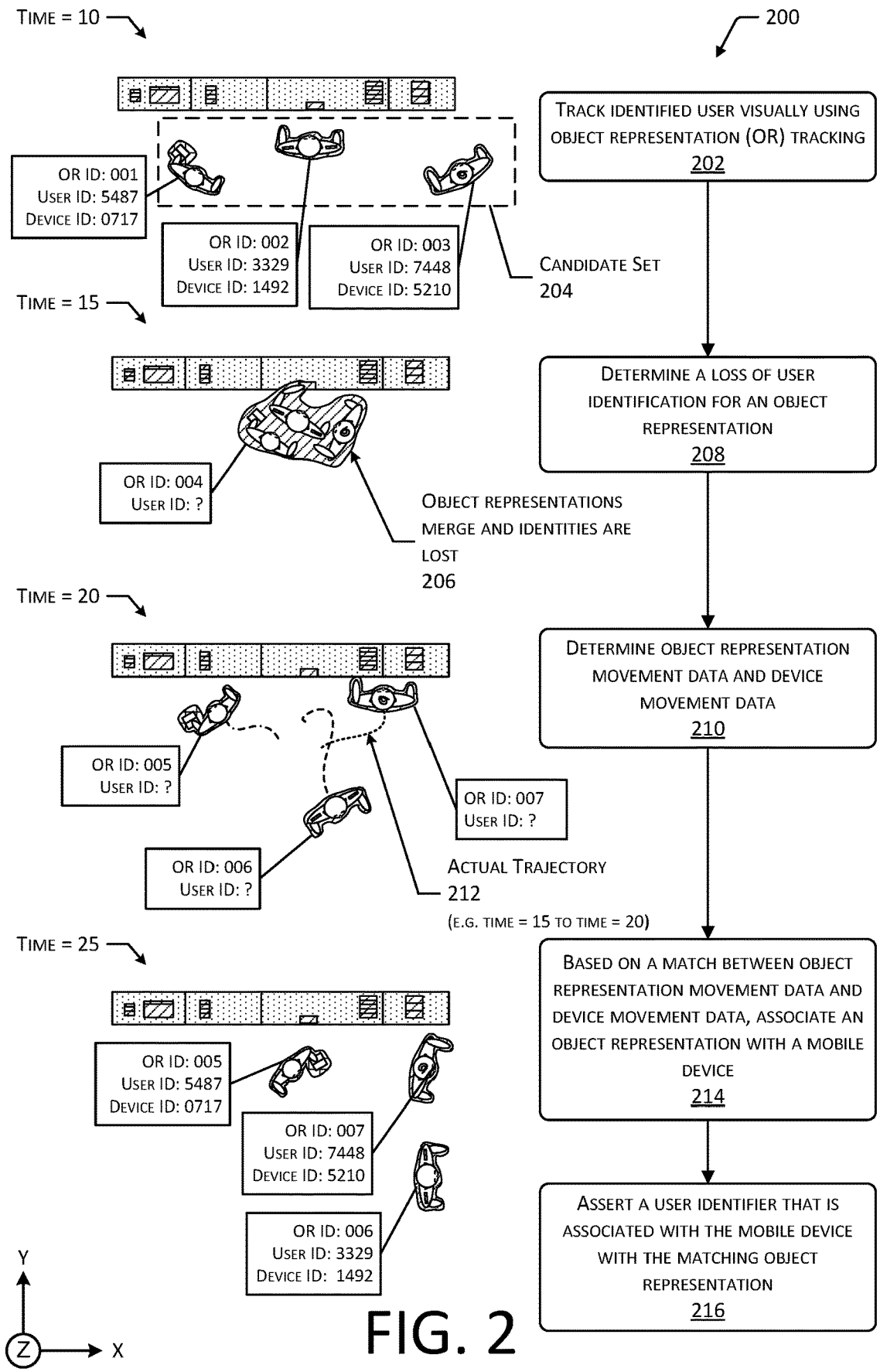
FIG. 2 depicts a scenario in which identity of a user is lost while using vision-based object representation tracking, and identity is reasserted by comparing object representation movement data with device movement data, according to some implementations.

FIG. 2 depicts a scenario 200 in which identity of a user 108 is lost while using vision-based object representation tracking and the identity is reasserted by comparing object representation movement data 128 with device movement data 138, according to some implementations.

At time=10 three users 108(1)-(3) are shown heading towards the same inventory location 104 in the facility 102. Each user 108 is associated with an object representation ID, a user ID 148, and a device ID 132. At 202, the identified users are tracked visually using object representation tracking. As described above, the visual tracking module 126 may generate object representation movement data 128 that indicates where these users 108 have been, and when, while in the facility 102. A candidate set 204 of user IDs 148 may be determined, as indicated here by the three users 108 that are within a threshold distance of one another. For example, the candidate set 204 may be generated when two or more users 108 come within a threshold distance of one another. In another example, the candidate set 204 may be retroactively determined using object representation movement data 128 obtained prior to a merger of object representations. In other implementations, the candidate set 204 may comprise device IDs 132.

At time=15 the users 108(1)-(3) have moved so close to one another, that as shown by 206, the individual object representations have merged and the identities of those individual object representations are lost. In this scenario, the users 108(1)-(3) are so close to one another, that the boundary difference used to designate the region of the object representation is no longer present between individual users 108. As a result, the individual object representations are no longer present, and instead the group of users 108(1)-(3) are within a single object representation. At 208, the visual tracking module 126 determines a loss of user identification for an object representation. For example, the visual tracking module 126 may be configured to determine that in the event of a merger of two previously identified object representations, the identity is uncertain and thus identification for that object representation is lost.

At time=20, the users 108(1)-(3) have completed their task at the inventory location 104 and have moved away from one another. Each user 108 is now a separate object representation, with a particular object representation ID, however the user ID 148 for each object representation is unknown. At 210, the tracking system 124 proceeds to determine the object representation movement data 128 and the device movement data 138. For example, the tracking system 124 may determine a candidate set of user IDs that comprises the user IDs 148 present prior to the object representation merger. The device association data 146 may be used to determine the device IDs 132 for those user IDs 148. A command may be sent to the mobile devices 110 with those device IDs 132 to begin collecting motion data 134. Once collected, the device data 130 may be used as described above to generate device movement data 138.

Also depicted as dotted lines are an actual trajectory 212 for each user 108 from time=15 to time=20. For example, the actual trajectory 212 may comprise a series of locations each associated with a particular timestamp.

At time=25, user IDs 148 have been asserted to the previously unidentified object representations. At 214, based on a match between the object representation movement data 128 and the device movement data 138, a particular object representation is associated with a particular mobile device 110. At 216, the user ID 148 that is associated with the mobile device 110 is asserted to the object representation that has the matching movement.

FIG. 3 depicts a diagram 300 of object representation movement data 128, device movement data 138, and device association data 146, according to some implementations. In this illustration, illustrative values of object representation movement data 128 and device movement data 138 are shown consistent with the scenario depicted in FIG. 2.

In this diagram 300, the data are depicted as tabular data structures by way of illustration and not necessarily as a limitation. In other implementations other data structures may be used, including but not limited to, flat files, databases, linked lists, trees, executable code, scripts, and so forth.

The object representation movement data 128 may comprise object representation identifiers (OR ID) 302. The visual tracking module 126 may assign an object representation identifier 302 to a particular object representation during operation. A timestamp 304 provides information indicative of when a particular movement type 306 was observed. The movement type 306 provides information about the type of movement of the object representation that was determined. For example, the movement type 306 may be "stopped" indicating the user 108 is not moving, "moving" indicating the user 108 is moving, "turning" indicating the user 108 is turning, and so forth. The time of a transition between these states may be indicated by the timestamp 304. For example, as shown here at timestamp 304 value 13, the movement type 306 of "stopped" began. In some implementations, the object representation movement data 128 may include information about rotation of the object representation. For example, the rotation of the object representation may be determined with respect to a vertical line. The object representation movement data 128 may be indicative of timing and occurrence of one or more of a start of movement, stop of movement, movement having a characteristic that is below a threshold value, movement having a characteristic that is above a threshold value, movement in a particular direction, start of rotation, stop of rotation, rotation at a rate greater than a threshold value, rotation at a rate less than a threshold value, or rotation in a particular direction. The characteristics may include one or more of velocity or acceleration.

In some implementations the object representation movement data 128 may include information indicative of a magnitude of acceleration of the object representation at particular times. For example, the magnitude of acceleration of the object representation may be determined based on the change in location of the object representation in successive images of the image data 120 and given the interval of time that elapsed between the successive images.

Similarly, the device movement data 138 may comprise the device ID 132, and timestamp 304 and movement type 306 data. As described above, the movement type 306 provides information about the type of movement of the mobile device 110 that was determined from the motion data 134. For example, the movement type 306 may be "stopped" indicating the mobile device 110 is not moving, "moving" indicating the mobile device 110 is moving, "turning" indicating the mobile device 110 is turning, and so forth. The time of a transition between these states may be indicated by the timestamp 304. For example, as shown here at timestamp 304 value 14, the movement type 306 of "stopped" began. In some implementations, the device movement data 138 may include information about rotation of the mobile device 110. For example, the rotation of the mobile device 110 may be determined with respect to a vertical line.

The device movement data 138 may be indicative of timing and occurrence of one or more of a start of movement, stop of movement, movement having a characteristic that is below a threshold value, movement having a characteristic that is above a threshold value, movement in a particular direction, start of rotation, stop of rotation, rotation at a rate greater than a threshold value, rotation at a rate less than a threshold value, or rotation in a particular direction. The characteristics may include one or more of velocity or acceleration.

The device movement data 138 may comprise other information about the movement of the mobile device 110. For example, the motion analysis module 136 may determine orientation of the mobile device 110 with respect to local vertical at particular times. Based on this orientation information, magnitude of acceleration of the mobile device 110 within a horizontal plane that is perpendicular to local vertical may be determined. For example, the horizontal plane may be parallel to a flat floor. The device movement data 138 may be indicative of a magnitude of acceleration during a particular period of time.

The device association data 146 provides information indicative of a relationship between particular device IDs 132 and user IDs 148. The device association data 146 may be determined in several ways. For example, during registration to use the facility 102, the device ID 132 of the mobile device 110 presented by the user 108 may be stored. In another example, during operation of the facility, the process described herein may be used to determine the device identifier 132. For example, given an object representation with a known user ID 148, the device ID 132 of the mobile device 110 having matching movements may be associated with that user ID 148.

The relationship between device ID 132 and user ID 148 is not necessarily a one-to-one correspondence. For example, a single user ID 148 may be associated with several different mobile devices 110, each with a different device ID 132. In another example, a single mobile device 110 may be used or shared by more than one person. For example, a parent may loan a child their cellphone.

In the situation where a device ID 132 is associated with more than one user IDs 148, other techniques may be used to disambiguate between the possible user IDs 148. For example, the identity of the user 108 may be determined at an entry portal to the facility 102. At that time, and for at least the duration of that particular visit by the user 108 to the facility, the user ID 148 determined at the entry portal may be associated with the mobile device 110. In another example, the mobile device 110 may present a user interface to the user 108, requesting confirmation of who is in possession of the mobile device 110 at that time.

In some implementations a message may be sent to the mobile device 110 to elicit one or more motions of the mobile device 110. For example, the message may comprise a request to "please shake the phone". For example, the shake may comprise a vigorous oscillatory linear motion of the mobile device 110 that results in a physical translation along one or more axes from a first location to a second location and then back to approximately the first location. In another example, the shake may comprise oscillatory rotations of the mobile device 110 along one or more axes. In some examples, the shake may include translation and rotation. The message may result in the user 108 unlimbering the mobile device 110 to look at the message. Continuing the example, responsive to hearing an audible prompt indicative of an incoming message, the user 108 may remove the mobile device 110 from their pocket or bag to look at a display on the device. The unlimbering may comprise the movement of the mobile device 110 from a first location to a second location over some interval of time, such as from the pocket to a particular position in front of the user that is associated with usage of the mobile device 110. By knowing when the message to elicit motion input was sent, the tracking system 124 may gather information that may be used to determine a particular object representation is a user 108 that is in possession of a particular mobile device 110.

The system and techniques described in this disclosure may be used to assert identity to other objects. For example, the tote 112 in the facility may include a mobile device 110 that provides device data 130. As a result, in some implementations the device association data 146 may associate a particular device ID 132 with a particular object ID. For example, the device ID 132 of the mobile device 110 on the tote 112 may be associated with an object ID of "2303".

Figure 4:
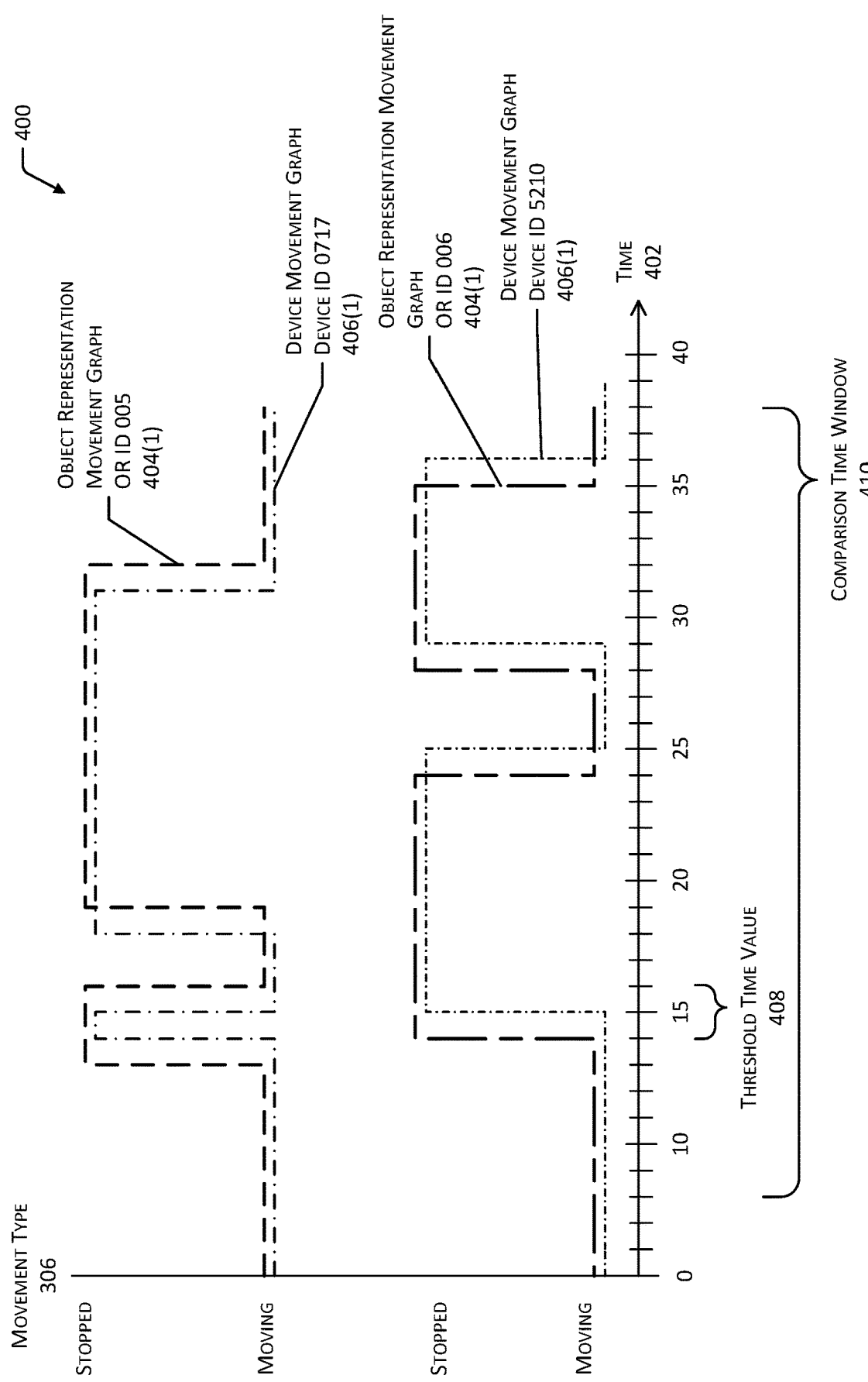
FIG. 4 illustrates graphs of object representation movement and device movement, according to some implementations.

FIG. 4 illustrates graphs 400 of object representation movement graphs and device movement graphs, according to some implementations. As described above, the comparison module 140 attempts to determine if there is a correspondence between the object representation movement data 128 and the device movement data 138. In one implementation, the correspondence may be visualized as a comparison between the graphs produced by the data.

In this graph, time 402 is shown increasing from left to right along a horizontal axis. An object representation movement graph 404(1) is shown that depicts the movement of object representation ID "005". A device movement graph 406(1) is shown that depicts the movement of mobile device "0717". The comparison of the graphs may take into account lags or delays associated with the timestamps 304 of the respective data. For example, the clocks used to generate the timestamps 304 at different devices may not be tightly synchronized. A threshold time value 408 may be used for the comparison to account for timing errors between the object representation movement data 128 and the device movement data 138. For example, the threshold time value 408 depicted here is 2 increments of time. Continuing the example, if an object representation movement and a device movement have the same movement type 306 within 2 increments of time of one another, they may be deemed to be representative of the same event.

The differences in movements create unique signatures that are shown in this illustration. Different users 108 will move differently throughout the facility. A comparison time window 410 designates a length of time during which the object representation movement data 128 and the device movement data 138 may be compared. As the comparison time window 410 increases, the confidence in a match between the object representation movement and the device movement increases. For example, over a time of several minutes, the particular pattern of stopping and starting for two users 108 will diverge, as each attends to their respective tasks at the facility 102. In some implementations, users may have very similar patterns, such as two users 108 walking together. However, as the comparison time window 410 is extended, even two users 108 walking together will exhibit differences, allowing for them to be disambiguated.

By way of illustration and not necessarily as a limitation, the examples described depict only two movement types 306, that of "stopped" and "moving". For example, movement types 306 such as "turning" or "running" may be used.

In other implementations, the movement graphs may be indicative of other values. For example, the object representation movement graph 404 and the device movement graph 406 may be based on values of one or more of magnitude of acceleration in a plane that is parallel to the floor, velocity, magnitude of rotation, direction of rotation, and so forth. Continuing the example, if a threshold portion of the pattern of the object representation movement graph 404 corresponds to within a threshold value of the pattern of the device movement graph 406, the user identifier 148 associated with the mobile device 110 that produced the device data 130 for the device movement graph 406 may be asserted with the object representation.

Figure 5:
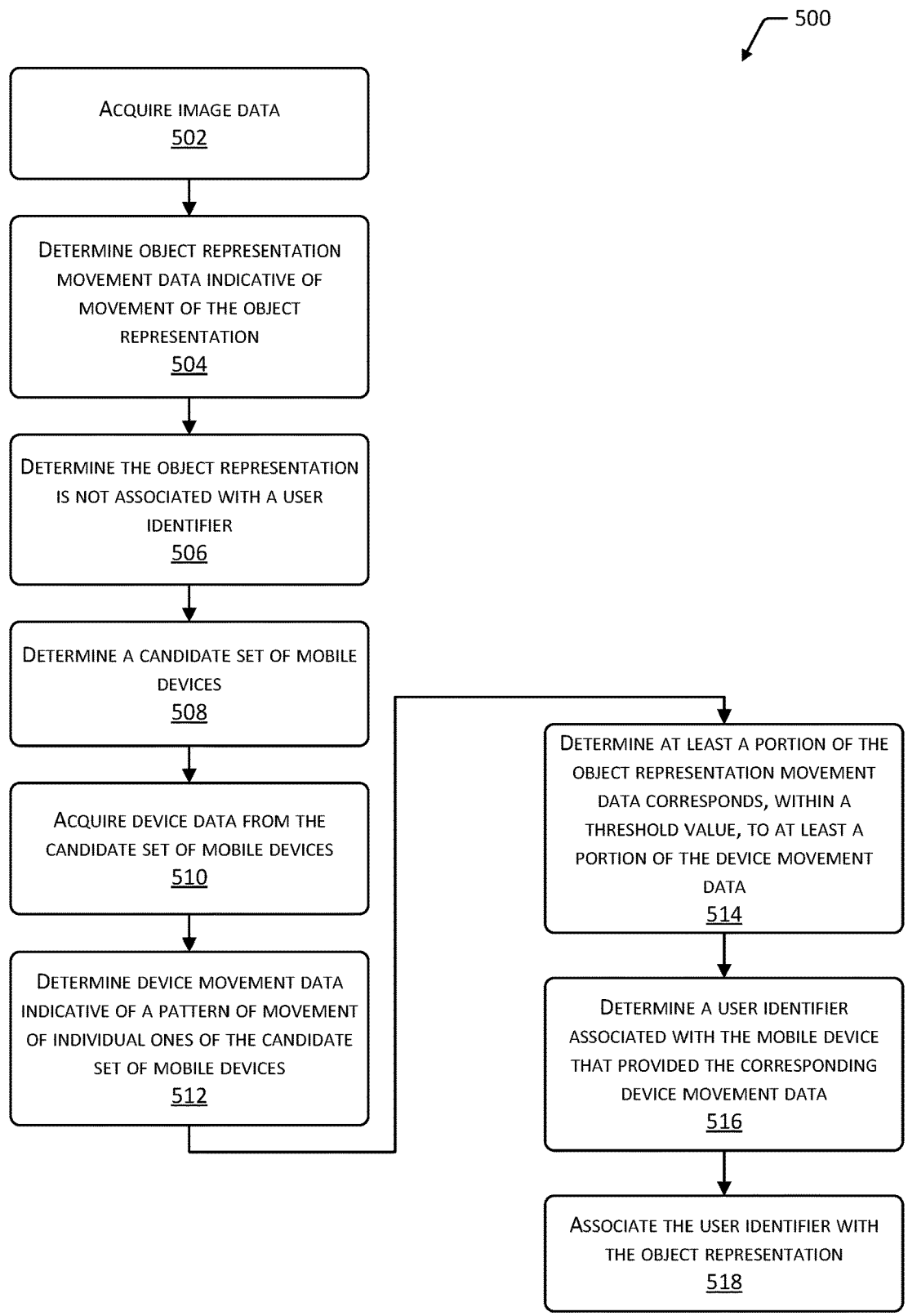
FIG. 5 depicts a flow diagram of a process of determining a user identifier to associate with an object representation being tracked by a visual tracking module, according to some implementations.

FIG. 5 depicts a flow diagram 500 of a process of determining a user ID 148 to associate with an object representation being tracked by a visual tracking module 126, according to some implementations.

At 502, image data 120 is obtained at a facility 102. For example, the cameras 114 within the facility 102 may send image data 120 over a network to the tracking system 124. The image data 120 may comprise a plurality of images that are acquired at different times.

At 504, object representation movement data 128 is determined. The object representation movement data 128 is indicative of the movement of the object representation. For example, the visual tracking module 126 may identify an object representation present in each of the plurality of images. The object representation that depicts the object in individual ones of the plurality of images may be tracked across the plurality of images. The object representation movement data 128 may be determined that is indicative of movement of the object representation in the plurality of images.

In one example, the object representation movement data 128 may indicate that the object representation is stopped at a first time. As described above, the object representation movement data 128 may comprise other information, such as data indicative of magnitude of acceleration within a horizontal plane that is perpendicular to a local vertical. As described above, the object representation comprises data about a portion of the object that is detected by a sensor, such as a camera 114 or a smart floor 116. As the object moves the object representation will move as well. For example, as the user 108 walks through the facility 102, the object representation of that user 108 in the image data 120 will also move. As a result, movement of the object representation may be representative of the movement of the object.

At 506, a determination is made that the object representation is not associated with a user ID 148. For example, no user ID 148 may have been previously associated with the object representation. In another example, the object representation may have previously been associated with a user ID 148, but that association has been lost.

At 508, a candidate set 204 of mobile devices is determined. For example, the candidate set of mobile devices may comprise a list of device IDs 132 of those mobile devices 110 that are within the facility 102 and currently unassociated with a particular object representation ID 302. In another example, the candidate set of mobile devices may comprise a list of device IDs 132 of those mobile devices 110 that were within a threshold distance of the unidentified object representation at a particular time.

The candidate set 204 of mobile devices may be determined based on the user IDs 148 present prior to a loss of identity for an object representation. For example, a candidate set 204 of user IDs 148 that were associated with object representations within a threshold distance of the object representation that experienced the loss of identity at a time of the loss of identity may be determined. A candidate set of mobile devices associated with the candidate set of user IDs may then be determined. For example, the device association data 146 may be used to lookup the device IDs 132 given particular user IDs 148. In other implementations, the device IDs 132 may be retrieved from previously stored tracking data 154. A command may then be sent to individual ones of the candidate set of mobile devices 110. The command may instruct the individual mobile device 110 to begin acquisition of motion data 134 and provide the resulting device data 130 to the tracking system 124.

At 510, device data 130 is acquired from the candidate set of mobile devices 110. For example, individual ones of the mobile devices 110 listed in the candidate set of mobile devices may be sent a command to begin acquiring device data 130. The acquired device data 130 may then be provided to the tracking system 124. The device data 130 may include a device ID 132 that indicates the particular mobile device 110 and the motion data 134 obtained from the motion sensors of the mobile device 110.

At 512, device movement data 138 is determined for individual ones of the mobile devices 110 in the candidate set of mobile devices 110. For example, the device movement data 138 may be indicative of, for a particular device ID 132, various events as indicated by timestamps 304 and movement types 306. The device movement data 138 is thus indicative of a pattern of movement of individual ones of the mobile devices 110. For example, the device movement data 138 may indicate that the mobile device 110 is stopped at a second time. In another example, the device movement data 138 may comprise data indicative of magnitude of acceleration within the horizontal plane that is perpendicular to a local vertical.

At 514, at least a portion of the object representation movement data 128 is determined to correspond, within a threshold value, to at least a portion of the device movement data 138. For example, as described above, the comparison module 140 may compare the object representation movement data 128 and the device movement data 138 to generate movement correspondence data 142 that indicates a particular object representation ID 302 has movement that matches the movement of a particular device ID 132. Continuing the example above, the first time may be determined to be within a threshold value of the second time. Given that the object representation movement data 128 and the device movement data 138 are indicative of the object representation and the mobile device 110 being stopped within the threshold value of time of one another, they may be determined to be associated with the same user 108. The particular object representation is now associated with a particular mobile device 110, based on the similarity of their movements.

In other implementations, other characteristics of the object representation movement data 128 and the device movement data 138 may be used to generate the movement correspondence data 142. For example, a first time series indicative of magnitude of the acceleration of the object representation may be compared to a second time series indicative of magnitude of the acceleration of the mobile device 110.

At 516, a user ID 148 is determined that is associated with the mobile device 110 that provided the corresponding device movement data 138. For example, the user identification module 144 may look up the device ID 132 in the movement correspondence data 142 to determine the user ID 148 that is associated with that device ID 132.

At 518, the user ID 148 is associated with the object representation ID 302 of the unidentified object representation. For example, the identification update data 150 that indicates the object representation ID 302 and the user ID 148 may be provided to the data fusion module 152. The data fusion module 152 may then assert the user ID 148 to the movement of the object representation represented by the object representation ID 302.

Figure 6:
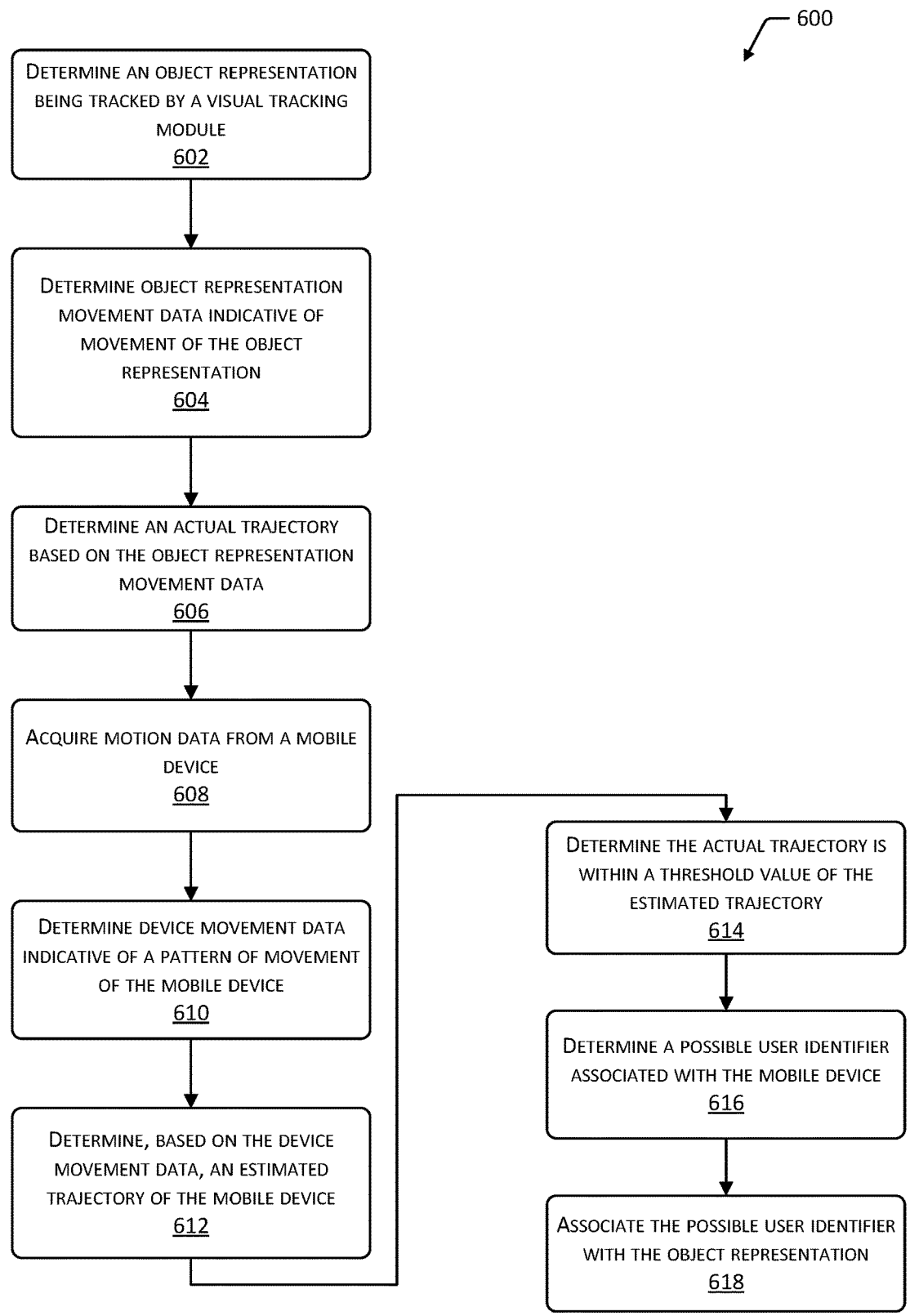
FIG. 6 depicts a flow diagram of a process of determining a user identifier to associate with the object representation based on trajectory data, according to some implementations.

FIG. 6 depicts a flow diagram 600 of a process of determining a user ID to associate with the object representation based on trajectory data, according to some implementations. In another implementation, the correspondence between the object representation movement data 128 and the device movement data 138 may be determined by using trajectory information.

At 602, an object representation is determined that is being tracked by a visual tracking module 126. For example, an object representation extraction algorithm may be executed against one or more of the images in the image data 120.

At 604, object representation movement data 128 is determined, indicative of movement of the object representation. For example, the visual tracking module 126 may generate the object representation movement data 128.

At 606, an actual trajectory is determined based on the object representation movement data 128. The actual trajectory 212 may include information that is indicative of a starting point, start time, direction of travel, a velocity, an end point, an end time, and so forth. In some implementations the actual trajectory 212 may comprise a time series of points indicating particular locations along the trajectory. Based on this time series, other information such as the direction of travel, velocity, and so forth may be determined.

At 608, motion data 134 may be acquired from one or more of the mobile devices 110. For example, the device data 130 may be sent from the mobile device 110 to the tracking system 124.

At 610, device movement data 138 is determined, that is indicative of a pattern of movement of the mobile device 110. For example, the device movement data 138 may comprise information such as a magnitude of acceleration, magnitude of rotation, direction of rotation, and so forth. However, the device movement data 138 may not include information such as a known starting location or ending location, with respect to the facility 102.

At 612, based on the device movement data 138, an estimated trajectory of the mobile device 110 is determined. For example, the known starting point from the actual trajectory 212 may be used. From this starting point, the device movement data 138 may be used to generate the estimated trajectory. In some implementations, the estimated trajectory may comprise a time series of points indicating particular locations along the trajectory. The time period of the actual trajectory 212 and the estimated trajectory may start at substantially the same time and end at substantially the same time.

At 614, the actual trajectory 212 is determined to be within a threshold value of the estimated trajectory. The comparison module 140 may be used to compare the trajectories. In one implementation, one or more points in the actual trajectory 212 may be compared with the estimated trajectory to determine if they are within a threshold distance of one another. In one implementation, the distance between a first location of an actual endpoint of the actual trajectory 212 and a second location of an estimated endpoint of the estimated trajectory may be compared to a threshold distance. If separated by less than the threshold distance, the estimated trajectory may be deemed to match the actual trajectory 212. In this way, the estimated trajectories based on the device data 130 from one or more mobile devices 110 may be assessed.

In other implementations other aspects of the trajectories may be compared. For example, acceleration at particular times may be determined and compared. Continuing the example, the actual trajectory 212 may be indicative of an actual acceleration within a first plane, such as a plane that is parallel to the floor of the facility 102. The estimated trajectory may be indicative of an estimated acceleration within that plane. If the acceleration within the particular times are within a threshold value of one another, the trajectories may be deemed to match.

Continuing the example of acceleration in a plane that is parallel to the floor, the motion data 134 may be processed to determine the direction of a vertical axis, as caused by gravity, and the directions of the resulting accelerations may be transformed into a plane perpendicular to the vertical axis. For example, the vertical axis may be aligned to a local vertical that is produced by gravity. Because a gravity field may be assumed constant and exhibit an acceleration downward along the vertical axis, the acceleration of the gravity field may be measured at a given time. Based on the apparent direction of that gravity field with respect to the IMU, one or more rotations may be determined that would align a Z axis of the IMU with the local vertical. Once aligned, accelerations within the X-Y plane may be determined. At 616, a possible user identifier associated with the mobile device is determined. At 618, the possible user identifier is associated with the object representation.

Figure 7:
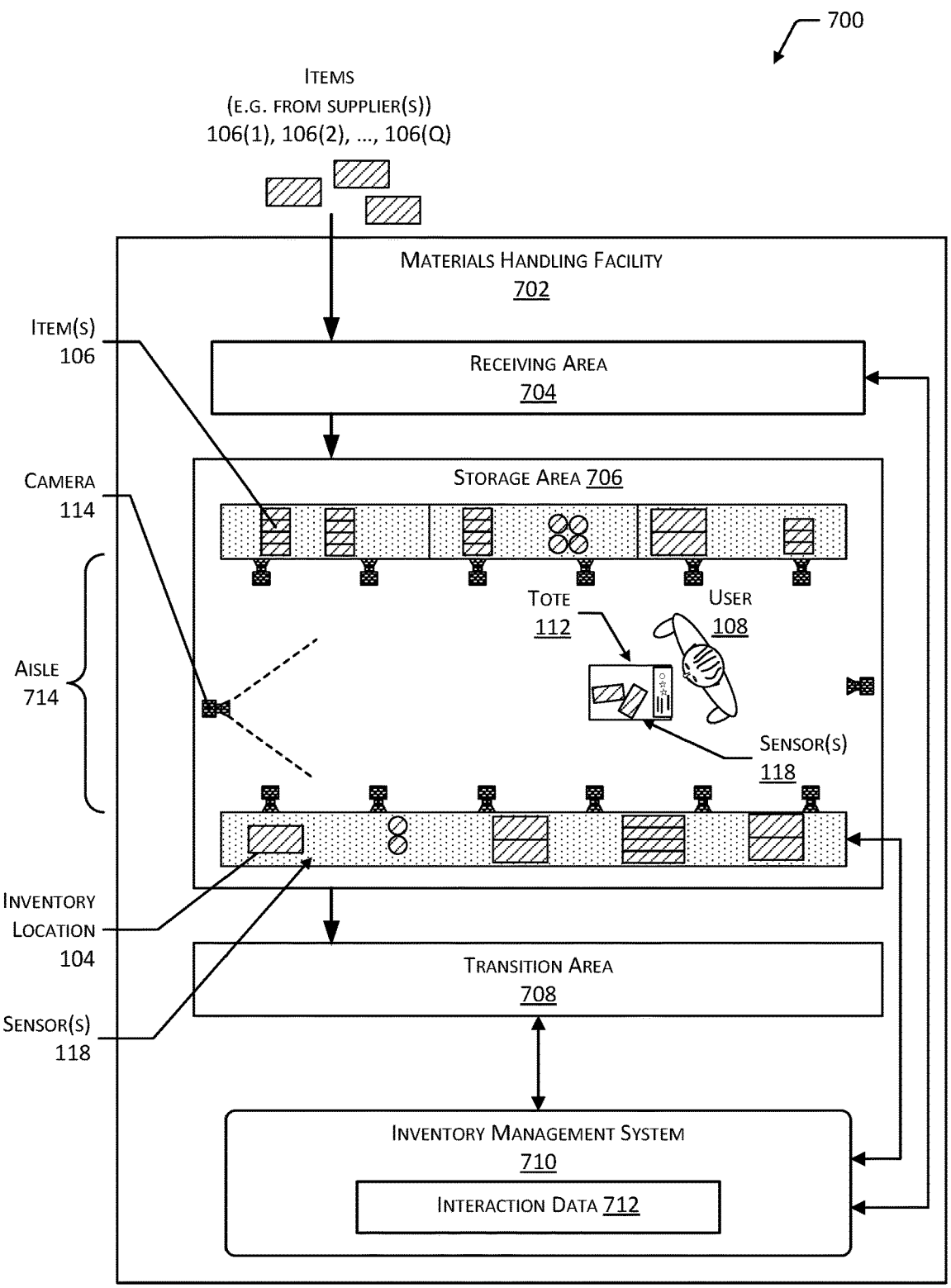
FIG. 7 is a block diagram of a materials handling facility (facility), according to some implementations.

FIG. 7 is a block diagram 700 illustrating a materials handling facility (facility) 702 using the system 100, according to some implementations. A facility 702 comprises one or more physical structures or areas within which one or more items 106(1), 106(2), . . . , 106(Q) may be held. As used in this disclosure, letters in parenthesis such as "(Q)" indicate an integer value greater than or equal to zero. The items 106 may comprise physical goods, such as books, pharmaceuticals, repair parts, electronic gear, and so forth.

The facility 702 may include one or more areas designated for different functions with regard to inventory handling. In this illustration, the facility 702 includes a receiving area 704, a storage area 706, and a transition area 708.

The receiving area 704 may be configured to accept items 106, such as from suppliers, for intake into the facility 702. For example, the receiving area 704 may include a loading dock at which trucks or other freight conveyances unload the items 106. In some implementations, the items 106 may be processed at the receiving area 704, to generate at least a portion of item data. For example, an item 106 may be imaged or otherwise scanned to develop reference images or representations of the item 106 at the receiving area 704.

The storage area 706 is configured to store the items 106. The storage area 706 may be arranged in various physical configurations. In one implementation, the storage area 706 may include one or more aisles 714. The aisle 714 may be configured with, or defined by, inventory locations 104 on one or both sides of the aisle 714.

One or more users 108 and totes 112 or other material handling apparatuses may move within the facility 702. For example, the user 108 may move about within the facility 702 to pick or place the items 106 in various inventory locations 104, placing them on the tote 112 for ease of transport. The tote 112 is configured to carry or otherwise transport one or more items 106. For example, the tote 112 may include a basket, cart, bag, bin, and so forth. In other implementations, other material handling apparatuses such as robots, forklifts, cranes, aerial drones, and so forth, may move about the facility 702 picking, placing, or otherwise moving the items 106. For example, a robot may pick an item 106 from a first inventory location 104(1) and move the item 106 to a second inventory location 104(2).

One or more sensors 118 may be configured to acquire information in the facility 702. The sensors 118 may include, but are not limited to, cameras 114, depth sensors 118(2), weight sensors 118(6), optical sensor arrays 118(13), proximity sensors 118(14), and so forth. The sensors 118 may be stationary or mobile, relative to the facility 702. For example, the inventory locations 104 may contain weight sensors 118(6) to acquire weight sensor data of items 106 stowed therein, cameras 114 to acquire images of picking or placement of items 106 on shelves, optical sensor arrays 118(13) to detect shadows of the user's 108 hands at the inventory locations 104, and so forth. In another example, the facility 702 may include cameras 114 to obtain images of the user 108 or other objects in the facility 702. The sensors 118 are discussed in more detail below with regard to FIG. 8.

While the storage area 706 is depicted as having a single aisle 714, inventory locations 104 storing the items 106, sensors 118, and so forth, it is understood that the receiving area 704, the transition area 708, or other areas of the facility 702 may be similarly equipped. Furthermore, the arrangement of the various areas within the facility 702 is depicted functionally rather than schematically. For example, in some implementations, multiple different receiving areas 704, storage areas 706, and transition areas 708 may be interspersed rather than segregated in the facility 702.

The facility 702 may include, or be coupled to, an inventory management system 710. The inventory management system 710 is configured to interact with users 108 or devices such as sensors 118, robots, material handling equipment, computing devices, and so forth, in one or more of the receiving area 704, the storage area 706, or the transition area 708.

During operation of the facility 702, the sensors 118 may be configured to provide sensor data, or information based on the sensor data, to the inventory management system 710. The sensor data may include image data 120, device data 130, weight sensor data obtained from weight sensors 118 (6), and so forth.

The inventory management system 710 or other systems may use the sensor data to track the location of objects within the facility 702, movement of the objects, or provide other functionality. Objects may include, but are not limited to, items 106, users 108, totes 112, and so forth. For example, the image data 120 acquired by the camera 114 may indicate removal by the user 108 of an item 106 from a particular location on the inventory location 104 and placement of the item 106 on or at least partially within the tote 112.

The facility 702 may be configured to receive different kinds of items 106 from various suppliers and to store them until a customer orders or retrieves one or more of the items 106. A general flow of items 106 through the facility 702 is indicated by the arrows of FIG. 7. Specifically, as illustrated in this example, items 106 may be received from one or more suppliers, such as manufacturers, distributors, wholesalers, and so forth, at the receiving area 704. In various implementations, the items 106 may include merchandise, commodities, perishables, or any suitable type of item 106, depending on the nature of the enterprise that operates the facility 702.

Upon being received from a supplier at the receiving area 704, the items 106 may be prepared for storage in the storage area 706. For example, in some implementations, items 106 may be unpacked or otherwise rearranged. The inventory management system 710 may include one or more software applications executing on a computer system to provide inventory management functions. These inventory management functions may include maintaining information indicative of the type, quantity, condition, cost, location, weight, or any other suitable parameters with respect to the items 106. The items 106 may be stocked, managed, or dispensed in terms of countable units, individual units, or multiple units, such as packages, cartons, crates, pallets, or other suitable aggregations. Alternatively, some items 106, such as bulk products, commodities, and so forth, may be stored in continuous or arbitrarily divisible amounts that may not be inherently organized into countable units. Such items 106 may be managed in terms of a measurable quantity such as units of length, area, volume, weight, time, duration, or other dimensional properties characterized by units of measurement. Generally speaking, a quantity of an item 106 may refer to either a countable number of individual or aggregate units of an item 106 or a measurable amount of an item 106, as appropriate.

After arriving through the receiving area 704, items 106 may be stored within the storage area 706. In some implementations, like items 106 may be stored or displayed together in the inventory locations 104 such as in bins, on shelves, hanging from pegboards, and so forth. In this implementation, all items 106 of a given kind are stored in one inventory location 104. In other implementations, like items 106 may be stored in different inventory locations 104. For example, to optimize retrieval of certain items 106 having frequent turnover within a large physical facility 702, those items 106 may be stored in several different inventory locations 104 to reduce congestion that might occur at a single inventory location 104.

When a customer order specifying one or more items 106 is received, or as a user 108 progresses through the facility 702, the corresponding items 106 may be selected or "picked" from the inventory locations 104 containing those items 106. In various implementations, item picking may range from manual to completely automated picking. For example, in one implementation, a user 108 may have a list of items 106 they desire and may progress through the facility 702 picking items 106 from inventory locations 104 within the storage area 706 and placing those items 106 into a tote 112. In other implementations, employees of the facility 702 may pick items 106 using written or electronic pick lists derived from customer orders. These picked items 106 may be placed into the tote 112 as the employee progresses through the facility 702.

After items 106 have been picked, the items 106 may be processed at a transition area 708. The transition area 708 may be any designated area within the facility 702 where items 106 are transitioned from one location to another or from one entity to another. For example, the transition area 708 may be a packing station within the facility 702. When the items 106 arrive at the transition area 708, the items 106 may be transitioned from the storage area 706 to the packing station. Information about the transition may be maintained by the inventory management system 710.

In another example, if the items 106 are departing the facility 702, a list of the items 106 may be obtained and used by the inventory management system 710 to transition responsibility for, or custody of, the items 106 from the facility 702 to another entity. For example, a carrier may accept the items 106 for transport with that carrier accepting responsibility for the items 106 indicated in the list. In another example, a user 108 may purchase or rent the items 106 and remove the items 106 from the facility 702. During use of the facility 702, the user 108 may move about the facility 702 to perform various tasks, such as picking or placing the items 106 in the inventory locations 104.

To facilitate operation of the facility 702, the inventory management system 710 is configured to use the sensor data including the image data 120 and other information such as the tracking data 154 to generate interaction data 712. For example, tracking data 154 may be used to associate a particular pick of an item 106 at a particular inventory location 104 with a particular user ID 148.

The interaction data 712 may provide information about an interaction, such as a pick of an item 106 from the inventory location 104, a place of an item 106 to the inventory location 104, a touch made to an item 106 at the inventory location 104, a gesture associated with an item 106 at the inventory location 104, and so forth. The interaction data 712 may include one or more of the type of interaction, interaction location identifier indicative of where from the inventory location 104 the interaction took place, item identifier, quantity change to the item 106, user ID, and so forth. The interaction data 712 may then be used to further update the item data. For example, the quantity of items 106 on hand at a particular lane on the shelf may be changed based on an interaction that picks or places one or more items 106.

The inventory management system 710 may combine or otherwise utilize data from different sensors 118 of different types to generate the interaction data 712. For example, weight data obtained from weight sensors 118(6) at the inventory location 104 may be used instead of, or in conjunction with, the image data 120 to determine the interaction data 712.

Figure 8:
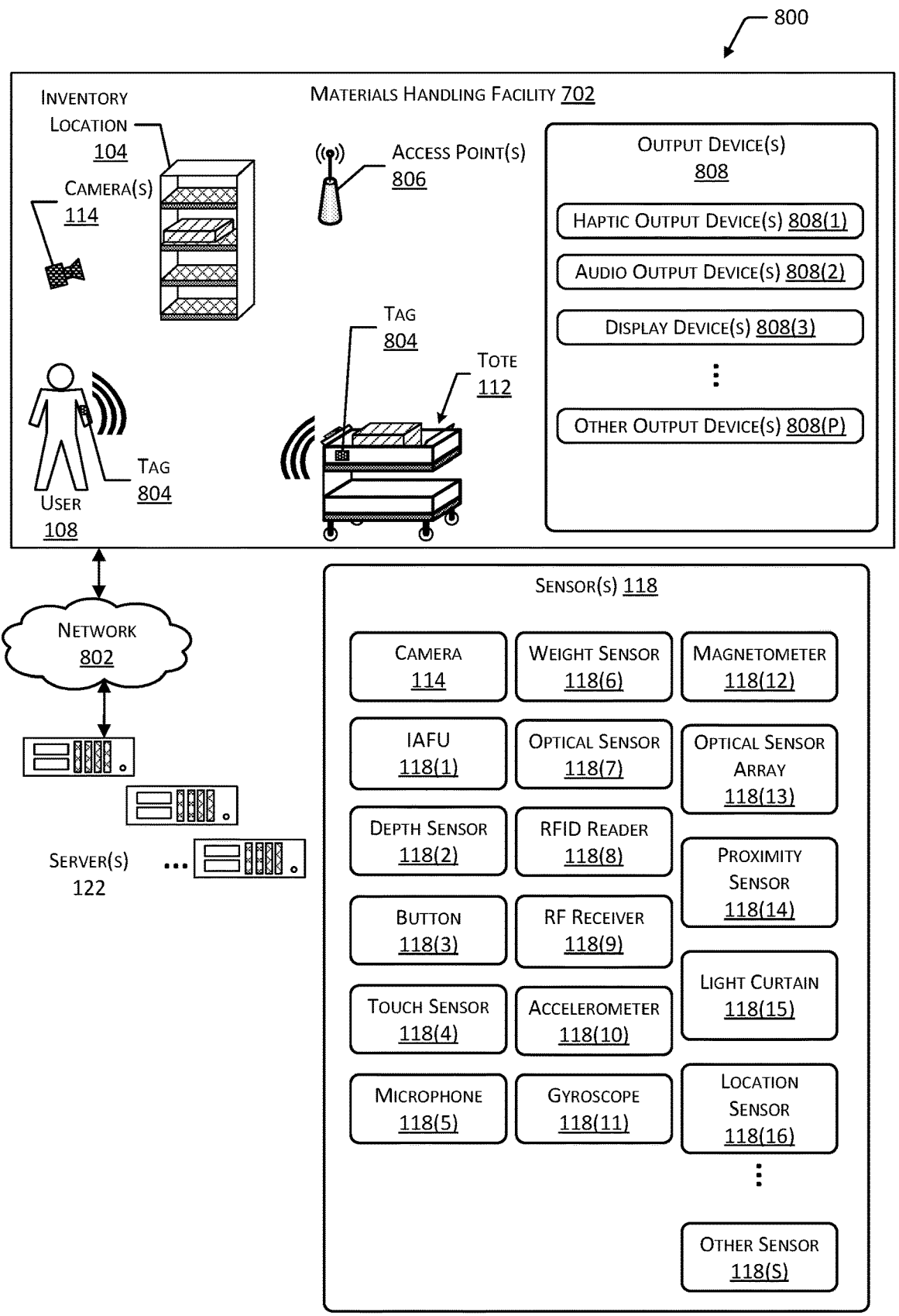
FIG. 8 is a block diagram illustrating additional details of the facility, according to some implementations.

FIG. 8 is a block diagram 800 illustrating additional details of the facility 702, according to some implementations. The facility 702 may be connected to one or more networks 802, which in turn connect to one or more servers 122. The network 802 may include private networks such as an institutional or personal intranet, public networks such as the Internet, or a combination thereof. The network 802 may utilize wired technologies (e.g., wires, fiber optic cables, and so forth), wireless technologies (e.g., radio frequency, infrared, acoustic, optical, and so forth), or other connection technologies. The network 802 is representative of any type of communication network, including one or more of data networks or voice networks. The network 802 may be implemented using wired infrastructure (e.g., copper cable, fiber optic cable, and so forth), a wireless infrastructure (e.g., cellular, microwave, satellite, and so forth), or other connection technologies.

The servers 122 may be configured to execute one or more modules or software applications associated with the inventory management system 710 or other systems. While the servers 122 are illustrated as being in a location outside of the facility 702, in other implementations, at least a portion of the servers 122 may be located at the facility 702. The servers 122 are discussed in more detail below with regard to FIG. 9.

The users 108, the totes 112, or other objects in the facility 702 may be equipped with one or more tags 804. The tags 804 may be configured to emit a signal. In one implementation, the tag 804 may be a radio frequency identification (RFID) tag 804 configured to emit an RF signal upon activation by an external signal. For example, the external signal may comprise a radio frequency signal or a magnetic field configured to energize or activate the RFID tag 804. In another implementation, the tag 804 may comprise a transmitter and a power source configured to power the transmitter. For example, the tag 804 may comprise a Bluetooth Low Energy (BLE) transmitter and battery. In other implementations, the tag 804 may use other techniques to indicate presence of the tag 804. For example, an acoustic tag 804 may be configured to generate an ultrasonic signal, which is detected by corresponding acoustic receivers. In yet another implementation, the tag 804 may be configured to emit an optical signal.

The inventory management system 710 may be configured to use the tags 804 for one or more of identification of the object, determining a location of the object, and so forth. For example, the users 108 may wear tags 804, the totes 112 may have tags 804 affixed, and so forth, which may be read and, based at least in part on signal strength, used to determine identity and location.

Generally, the inventory management system 710 or other systems associated with the facility 702 may include any number and combination of input components, output components, and servers 122.

The one or more sensors 118 may be arranged at one or more locations within the facility 702. For example, the sensors 118 may be mounted on or within a floor, wall, at a ceiling, at an inventory location 104, on a tote 112, may be carried or worn by a user 108, and so forth.

The sensors 118 may include an instrumented auto-facing unit (IAFU) 118(1). The IAFU 118(1) may comprise a position sensor or encoder configured to provide data indicative of displacement of a pusher. As an item 106 is removed from the IAFU 118(1), the pusher moves, such as under the influence of a spring, and pushes the remaining items 106 in the IAFU 118(1) to the front of the inventory location 104. By using data from the position sensor, and given item data such as a depth of an individual item 106, a count may be determined, based on a change in position data. For example, if each item 106 is 1 inch deep, and the position data indicates a change of 8 inches, the quantity held by the IAFU 118(1) may have changed by 8 items 106. This count information may be used to confirm or provide a cross check for a count obtained by other means, such as analysis of the image data 120.

The sensors 118 may include one or more cameras 114 or other imaging sensors. The one or more cameras 114 may include imaging sensors configured to acquire images of a scene. The cameras 114 are configured to detect light in one or more wavelengths including, but not limited to, terahertz, infrared, visible, ultraviolet, and so forth. The cameras 114 may comprise charge coupled devices (CCD), complementary metal oxide semiconductor (CMOS) devices, microbolometers, and so forth. The inventory management system 710 may use image data 120 acquired by the cameras 114 during operation of the facility 702. For example, the inventory management system 710 may identify items 106, users 108, totes 112, and so forth, based at least in part on their appearance within the image data 120 acquired by the cameras 114. The cameras 114 may be mounted in various locations within the facility 702. For example, cameras 114 may be mounted overhead, on inventory locations 104, may be worn or carried by users 108, may be affixed to totes 112, and so forth.

One or more depth sensors 118(2) may also be included in the sensors 118. The depth sensors 118(2) are configured to acquire spatial or three-dimensional (3D) data, such as depth information, about objects within a field-of-view. The depth sensors 118(2) may include range cameras, lidar systems, sonar systems, radar systems, structured light systems, stereo vision systems, optical interferometry systems, and so forth. The inventory management system 710 may use the 3D data acquired by the depth sensors 118(2) to identify objects, determine a location of an object in 3D real space, and so forth.

One or more buttons 118(3) may be configured to accept input from the user 108. The buttons 118(3) may comprise mechanical, capacitive, optical, or other mechanisms. For example, the buttons 118(3) may comprise mechanical switches configured to accept an applied force from a touch of the user 108 to generate an input signal. The inventory management system 710 may use data from the buttons 118(3) to receive information from the user 108. For example, the tote 112 may be configured with a button 118(3) to accept input from the user 108 and send information indicative of the input to the inventory management system 710.

The sensors 118 may include one or more touch sensors 118(4). The touch sensors 118(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 710 may use data from the touch sensors 118(4) to receive information from the user 108. For example, the touch sensor 118(4) may be integrated with the tote 112 to provide a touchscreen with which the user 108 may select from a menu one or more particular items 106 for picking, enter a manual count of items 106 at an inventory location 104, and so forth.

One or more microphones 118(5) or other acoustic transducers may be configured to acquire information indicative of sound present in the environment. In some implementations, arrays of microphones 118(5) may be used. These arrays may implement beamforming techniques to provide for directionality of gain. The inventory management system 710 may use the one or more microphones 118(5) to acquire information from acoustic tags 804, accept voice input from the users 108, determine ambient noise level, and so forth.

One or more weight sensors 118(6) are configured to measure the weight of a load, such as the item 106, the tote 112, or other objects. The weight sensors 118(6) may be configured to measure the weight of the load at one or more of the inventory locations 104, the tote 112, on the floor of the facility 702, and so forth. For example, the shelf may include a plurality of lanes or platforms, with one or more weight sensors 118(6) beneath each one to provide weight sensor data about an individual lane or platform. The weight sensors 118(6) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 118(6) may operate as transducers that generate one or more signals based on an applied force, such as that of the load due to gravity. For example, the weight sensor 118(6) may comprise a load cell having a strain gauge and a structural member that deforms slightly when weight is applied. By measuring a change in the electrical characteristic of the strain gauge, such as capacitance or resistance, the weight may be determined. In another example, the weight sensor 118(6) may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 710 may use the data acquired by the weight sensors 118(6) to identify an object, determine a change in the quantity of objects, determine a location of an object, maintain shipping records, and so forth.

The sensors 118 may include one or more optical sensors 118(7). The optical sensors 118(7) may be configured to provide data indicative of one or more of color or intensity of light impinging thereupon. For example, the optical sensor 118(7) may comprise a photodiode and associated circuitry configured to generate a signal or data indicative of an incident flux of photons. As described below, the optical sensor array 118(13) may comprise a plurality of the optical sensors 118(7). For example, the optical sensor array 118(13) may comprise an array of ambient light sensors such as the 15176683 as provided by Intersil Corporation of Milpitas, Calif., USA, or the MAX44009 as provided by Maxim Integrated of San Jose, Calif., USA. In other implementations, other optical sensors 118(7) may be used. The optical sensors 118(7) may be sensitive to one or more of infrared light, visible light, or ultraviolet light. The optical sensors 118(7) may include photodiodes, photoresistors, photovoltaic cells, quantum dot photoconductors, bolometers, pyroelectric infrared detectors, and so forth. For example, the optical sensor 118(7) may use germanium photodiodes to detect infrared light.

One or more radio frequency identification (RFID) readers 118(8), near field communication (NFC) systems, and so forth, may be included as sensors 118. For example, the RFID readers 118(8) may be configured to read the RF tags 804. Information acquired by the RFID reader 118(8) may be used by the inventory management system 710 to identify an object associated with the RF tag 804 such as the item 106, the user 108, the tote 112, and so forth. For example, based on information from the RFID readers 118(8) detecting the RF tag 804 at different times and RFID readers 118(8) having different locations in the facility 702, a velocity of the RF tag 804 may be determined.

One or more RF receivers 118(9) may also be included as sensors 118. In some implementations, the RF receivers 118(9) may be part of transceiver assemblies. The RF receivers 118(9) may be configured to acquire RF signals associated with Wi-Fi, Bluetooth, ZigBee, 8G, 7G, 3G, LTE, or other wireless data transmission technologies. The RF receivers 118(9) may provide information associated with data transmitted via radio frequencies, signal strength of RF signals, and so forth. For example, information from the RF receivers 118(9) may be used by the inventory management system 710 to determine a location of an RF source, such as a communication interface onboard the tote 112.

The sensors 118 may include one or more accelerometers 118(10), which may be worn or carried by the user 108, mounted to the tote 112, and so forth. The accelerometers 118(10) may provide information such as the direction and magnitude of an imposed acceleration. Data such as rate of acceleration, determination of changes in direction, speed, and so forth, may be determined using the accelerometers 118(10).

A gyroscope 118(11) may provide information indicative of rotation of an object affixed thereto. For example, the tote 112 or other objects may be equipped with a gyroscope 118(11) to provide data indicative of a change in orientation of the object.

A magnetometer 118(12) may be used to determine an orientation by measuring ambient magnetic fields, such as the terrestrial magnetic field. The magnetometer 118(12) may be worn or carried by the user 108, mounted to the tote 112, and so forth. For example, the magnetometer 118(12) mounted to the mobile device 110 may act as a compass and provide heading information indicative of which direction the mobile device 110 is oriented. In some implementations the device data 130 may include the heading information. The comparison module 140 may compare the heading information from the magnetometer with information in the object representation movement data 128 that indicates an apparent heading of the object representation.

An optical sensor array 118(13) may comprise one or more optical sensors 118(7). The optical sensors 118(7) may be arranged in a regular, repeating, or periodic two-dimensional arrangement such as a grid. The optical sensor array 118(13) may generate image data 120. For example, the optical sensor array 118(13) may be arranged within or below an inventory location 104 and obtain information about shadows of items 106, hand of the user 108, and so forth.

The sensors 118 may include proximity sensors 118(14) used to determine presence of an object, such as the user 108, the tote 112, and so forth. The proximity sensors 118(14) may use optical, electrical, ultrasonic, electromagnetic, or other techniques to determine a presence of an object. In some implementations, the proximity sensors 118(14) may use an optical emitter and an optical detector to determine proximity. For example, an optical emitter may emit light, a portion of which may then be reflected by the object back to the optical detector to provide an indication that the object is proximate to the proximity sensor 118(14). In other implementations, the proximity sensors 118(14) may comprise a capacitive proximity sensor 118(14) configured to provide an electrical field and determine a change in electrical capacitance due to presence or absence of an object within the electrical field.

The proximity sensors 118(14) may be configured to provide sensor data indicative of one or more of a presence or absence of an object, a distance to the object, or characteristics of the object. An optical proximity sensor 118(14) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 118 such as a camera 114. Based on an apparent distance between the features of the structured light pattern, the distance to the object may be calculated. Other techniques may also be used to determine distance to the object. In another example, the color of the reflected light may be used to characterize the object, such as skin, clothing, tote 112, and so forth.

The sensors 118 may include a light curtain 118(15) that utilizes a linear array of light emitters and a corresponding linear array of light detectors. For example, the light emitters may comprise a line of infrared light emitting diodes (LEDs) or vertical cavity surface emitting lasers (VCSELs) that are arranged above a top shelf in front of the inventory location 104, while the light detectors comprise a line of photodiodes sensitive to infrared light arranged below the light emitters. The light emitters produce a "lightplane" or sheet of infrared light that is then detected by the light detectors. An object passing through the lightplane may decrease the amount of light falling upon the light detectors. For example, the user's 108 hand would prevent at least some of the light from light emitters from reaching a corresponding light detector. As a result, a position along the linear array of the object may be determined that is indicative of a touchpoint. This position may be expressed as touchpoint data, with the touchpoint being indicative of the intersection between the hand of the user 108 and the sheet of infrared light. In some implementations, a pair of light curtains 118(15) may be arranged at right angles relative to one another to provide two-dimensional touchpoint data indicative of a position of touch in a plane. Input from the light curtain 118(15), such as indicating occlusion from a hand of a user 108 may be used to trigger acquisition or selection of image data 120 for processing by the inventory management system 710.

A location sensor 118(16) may be configured to provide information such as geographic coordinates, speed, heading, and so forth. The location sensor 118(16) may comprise a radio navigation-based system, such as a terrestrial or satellite-based navigational system. Satellite-based navigational systems may include a GPS receiver, a Global Navigation Satellite System (GLONASS) receiver, a Galileo receiver, a BeiDou Navigation Satellite System (BDS) receiver, an Indian Regional Navigational Satellite System, and so forth.

The sensors 118 may include other sensors 118(S) as well. For example, the other sensors 118(S) may include ultrasonic rangefinders, thermometers, barometric sensors, hygrometers, and so forth. For example, the inventory management system 710 may use information acquired from thermometers and hygrometers in the facility 702 to direct the user 108 to check on delicate items 106 stored in a particular inventory location 104, which is overheating, too dry, too damp, and so forth.

In some implementations, the camera 114 or other sensors 118(S) may include hardware processors, memory, and other elements configured to perform various functions. For example, the cameras 114 may be configured to generate image data 120, send the image data 120 to another device such as the server 122, and so forth.

The facility 702 may include one or more access points 806 configured to establish one or more wireless networks. The access points 806 may use Wi-Fi, NFC, Bluetooth, or other technologies to establish wireless communications between a device and the network 802. The wireless networks allow the devices to communicate with one or more of the sensors 118, the inventory management system 710, the optical sensor arrays 118(13), the tag 804, a communication device of the tote 112, or other devices.

Output devices 808 may also be provided in the facility 702. The output devices 808 are configured to generate signals, which may be perceived by the user 108 or detected by the sensors 118. In some implementations, the output devices 808 may be used to provide illumination of the optical sensor array 118(13), light curtain 118(15), and so forth.

Haptic output devices 808(1) are configured to provide a signal that results in a tactile sensation to the user 108. The haptic output devices 808(1) may use one or more mechanisms such as electrical stimulation or mechanical displacement to provide the signal. For example, the haptic output devices 808(1) may be configured to generate a modulated electrical signal, which produces an apparent tactile sensation in one or more fingers of the user 108. In another example, the haptic output devices 808(1) may comprise piezoelectric or rotary motor devices configured to provide a vibration, which may be felt by the user 108.

One or more audio output devices 808(2) may be configured to provide acoustic output. The acoustic output includes one or more of infrasonic sound, audible sound, or ultrasonic sound. The audio output devices 808(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output. In another example, a location of the mobile device 110 in the facility 702 may be determined based on device data 130 indicative of ultrasonic sound emitted by audio output devices 808(2) positioned within the facility 702.

The display devices 808(3) may be configured to provide output, which may be seen by the user 108 or detected by a light-sensitive sensor such as a camera 114 or an optical sensor 118(7). In some implementations, the display devices 808(3) may be configured to produce output in one or more of infrared, visible, or ultraviolet light. The output may be monochrome or in color. The display devices 808(3) may be one or more of emissive, reflective, microelectromechanical, and so forth. An emissive display device 808(3), such as using LEDs, is configured to emit light during operation. In comparison, a reflective display device 808(3), such as using an electrophoretic element, relies on ambient light to present an image. Backlights or front lights may be used to illuminate non-emissive display devices 808(3) to provide visibility of the output in conditions where the ambient light levels are low.

The display devices 808(3) may be located at various points within the facility 702. For example, the addressable displays may be located on inventory locations 104, totes 112, on the floor of the facility 702, and so forth.

Other output devices 808(P) may also be present. For example, the other output devices 808(P) may include scent/odor dispensers, document printers, 3D printers or fabrication equipment, and so forth.

Figure 9:
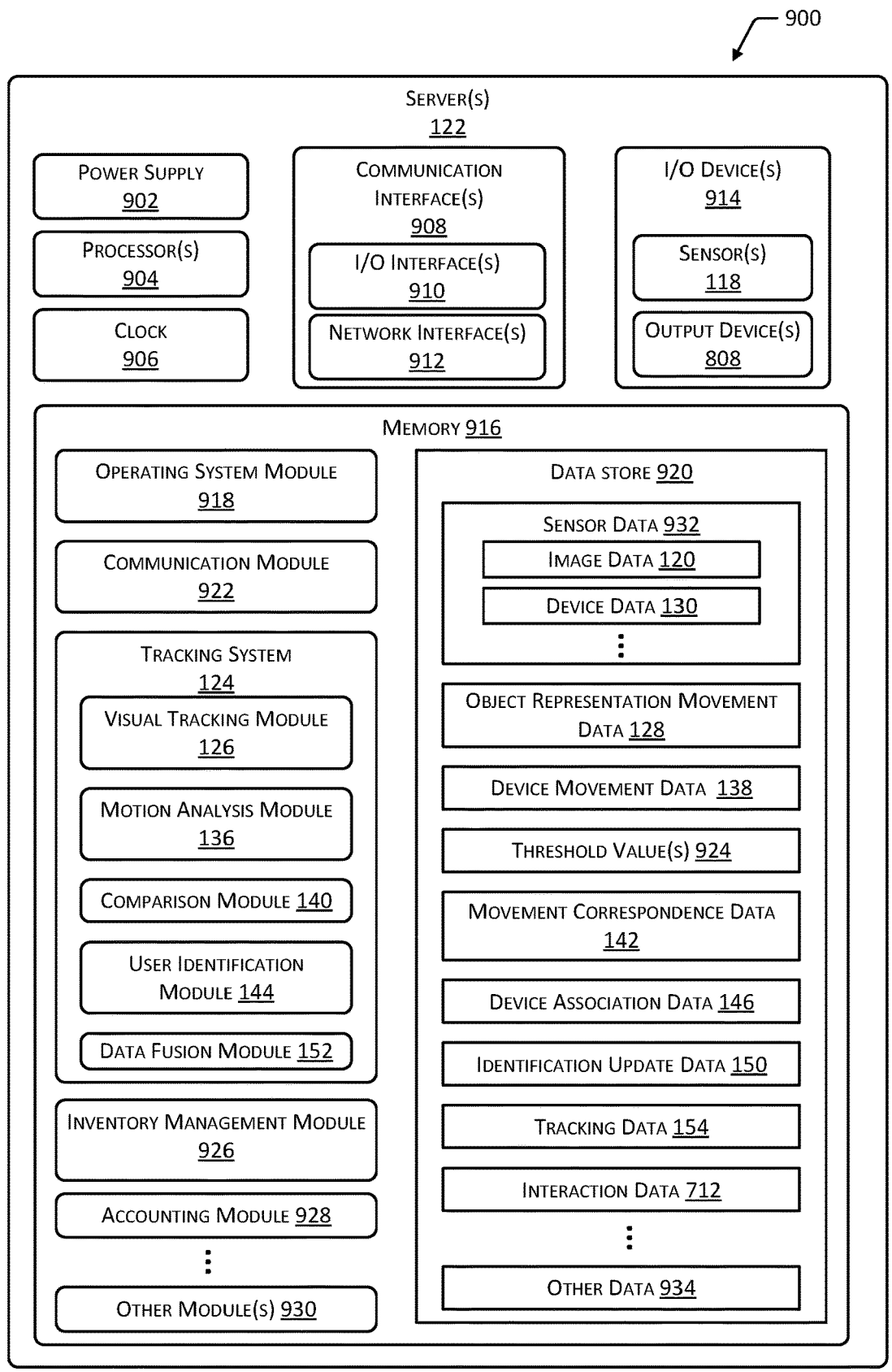
FIG. 9 illustrates a block diagram of a server configured to support operation of the facility, according to some implementations.

FIG. 9 illustrates a block diagram 900 of a server 122 configured to support operation of the facility 702, according to some implementations. The server 122 may be physically present at the facility 702, may be accessible by the network 802, or a combination of both. The server 122 does not require end-user knowledge of the physical location and configuration of the system that delivers the services. Common expressions associated with the server 122 may include "on-demand computing", "software as a service (SaaS)", "platform computing", "network-accessible platform", "cloud services", "data centers", and so forth. Services provided by the server 122 may be distributed across one or more physical or virtual devices.

One or more power supplies 902 may be configured to provide electrical power suitable for operating the components in the server 122. The one or more power supplies 902 may comprise batteries, capacitors, fuel cells, photovoltaic cells, wireless power receivers, conductive couplings suitable for attachment to an external power source such as provided by an electric utility, and so forth. The server 122 may include one or more hardware processors 904 (processors) configured to execute one or more stored instructions. The processors 904 may comprise one or more cores. One or more clocks 906 may provide information indicative of date, time, ticks, and so forth. For example, the processor 904 may use data from the clock 906 to associate a particular interaction with a particular point in time.

The server 122 may include one or more communication interfaces 908 such as input/output (I/O) interfaces 910, network interfaces 912, and so forth. The communication interfaces 908 enable the server 122, or components thereof, to communicate with other devices or components. The communication interfaces 908 may include one or more I/O interfaces 910. The I/O interfaces 910 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 910 may couple to one or more I/O devices 914. The I/O devices 914 may include input devices such as one or more of a sensor 118, keyboard, mouse, scanner, and so forth. The I/O devices 914 may also include output devices 808 such as one or more of a display device 808(3), printer, audio speakers, and so forth. In some embodiments, the I/O devices 914 may be physically incorporated with the server 122 or may be externally placed.

The network interfaces 912 may be configured to provide communications between the server 122 and other devices, such as the totes 112, routers, access points 806, and so forth. The network interfaces 912 may include devices configured to couple to personal area networks (PANs), local area networks (LANs), wireless local area networks (WLANS), wide area networks (WANs), and so forth. For example, the network interfaces 912 may include devices compatible with Ethernet, Wi-Fi, Bluetooth, ZigBee, and so forth.

The server 122 may also include one or more busses or other internal communications hardware or software that allow for the transfer of data between the various modules and components of the server 122.

As shown in FIG. 9, the server 122 includes one or more memories 916. The memory 916 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 916 provides storage of computer-readable instructions, data structures, program modules, and other data for the operation of the server 122. A few example functional modules are shown stored in the memory 916, although the same functionality may alternatively be implemented in hardware, firmware, or as a system on a chip (SoC).

The memory 916 may include at least one operating system (OS) module 918. The OS module 918 is configured to manage hardware resource devices such as the I/O interfaces 910, the I/O devices 914, the communication interfaces 908, and provide various services to applications or modules executing on the processors 904. The OS module 918 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 916 may be a data store 920 and one or more of the following modules. These modules may be executed as foreground applications, background tasks, daemons, and so forth. The data store 920 may use a flat file, database, linked list, tree, executable code, script, or other data structure to store information. In some implementations, the data store 920 or a portion of the data store 920 may be distributed across one or more other devices including the servers 122, network attached storage devices, and so forth.

A communication module 922 may be configured to establish communications with one or more of other servers 122, the mobile devices 110, the totes 112, sensors 118, or other devices. The communications may be authenticated, encrypted, and so forth.

The memory 916 may store the tracking system 124. The functions of the visual tracking module 126 are described above with regard to the tracking system 124. For example, the tracking system 124 may include the visual tracking module 126, the motion analysis module 136, the comparison module 140, the user identification module 144, the data fusion module 152, and so forth. The tracking system 124 may store information at least in part in the data store 920.

For example, the tracking system 124 may store one or more threshold values 924 in the data store 920. During operation, the tracking system 124 may access sensor data 932. The sensor data 932 may be stored at least in part in the data store 920. The sensor data 932 comprises information acquired by one or more of the sensors 118. For example, the sensor data 932 may comprise the image data 120, the device data 130, weight data from weight sensors 118(6), and so forth.

The memory 916 may also store an inventory management module 926. The inventory management module 926 is configured to provide the inventory functions as described herein with regard to the inventory management system 710. For example, the inventory management module 926 may track items 106 between different inventory locations 104, to and from the totes 112, and so forth. During operation, the inventory management module 926 may access sensor data 932, such as the image data 120, data from other sensors 118, and so forth.

The accounting module 928 may be configured to assess charges to accounts associated with particular users 108 or other entities. For example, the interaction data 712 may indicate that the user 108 has removed a particular item 106 from an inventory location 104. Based on the interaction data 712, the accounting module 928 may assess the charge to a payment instrument associated with the account.

Processing of sensor data 932, such as the image data 120, may be performed by a module implementing, at least in part, one or more of the following tools or techniques. In one implementation, processing of the image data 120 may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 932. In still another implementation, functions such as those in the Machine Vision Toolbox for Matlab (MVTB) available using MATLAB as developed by Math Works, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 932 or other data. For example, the ANN may be a trained using a supervised learning algorithm such that object identifiers are associated with images of particular objects within training images provided to the ANN. Once trained, the ANN may be provided with the sensor data 932 such as the image data 120 to generate identification data of an object.

Other modules 930 may also be present in the memory 916 as well as other data 934 in the data store 920.

Figure 10:
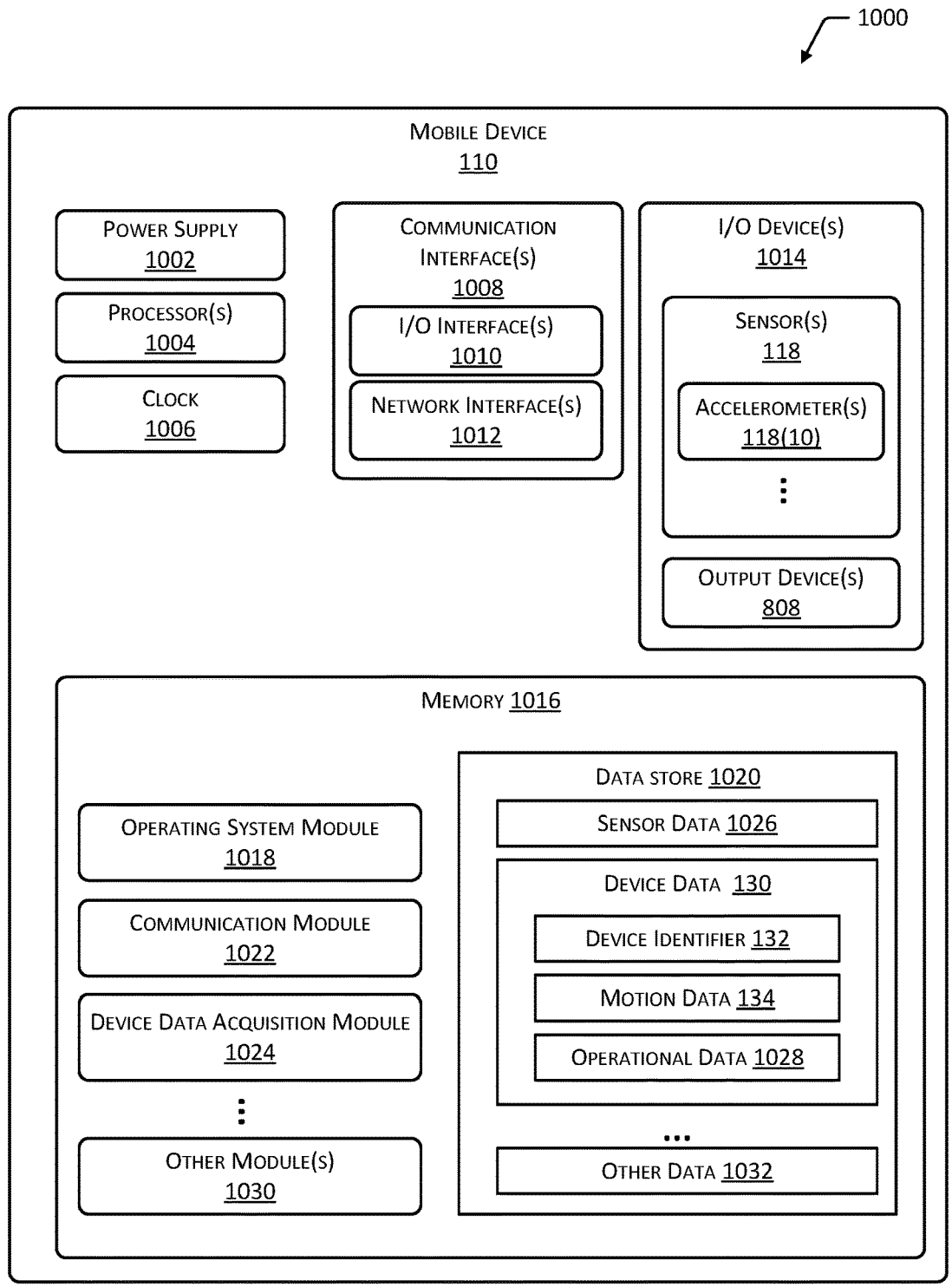
FIG. 10 illustrates a block diagram of a mobile device configured to provide motion data, according to some implementations.

FIG. 10 illustrates a block diagram 1000 of a mobile device 110 configured to provide device data 130, according to some implementations.

Similar to the server(s) 122 described above, the mobile device 110 may include one or more power supplies 1002. The mobile device 110 may include one or more hardware processors 1004 (processors) configured to execute one or more stored instructions. The processors 1004 may comprise one or more cores. One or more clocks 1006 may provide information indicative of date, time, ticks, and so forth. For example, the processor 1004 may use data from the clock 1006 to associate a particular interaction with a particular point in time.

The mobile device 110 may include one or more communication interfaces 1008 such as I/O interfaces 1010, network interfaces 1012, and so forth. The communication interfaces 1008 enable the mobile device 110, or components thereof, to communicate with other devices or components. The communication interfaces 1008 may include one or more I/O interfaces 1010. The I/O interfaces 1010 may comprise I2C, SPI, USB, RS-232, and so forth.

The I/O interface(s) 1010 may couple to one or more I/O devices 1014. The I/O devices 1014 may include input devices such as one or more of a sensor 118, keyboard, mouse, scanner, and so forth. The I/O devices 1014 may also include output devices 808 such as one or more of a display device 808(3), printer, audio speakers, and so forth. In some embodiments, the I/O devices 1014 may be physically incorporated with the mobile device 110 or may be externally placed.

The network interfaces 1012 may be configured to provide communications between the mobile device 110, the server 122, the totes 112, routers, access points 806, and so forth. The network interfaces 1012 may include devices configured to couple to PANs, LANs, WLANS, WANs, and so forth. For example, the network interfaces 1012 may include devices compatible with Ethernet, Wi-Fi, Bluetooth, ZigBee, and so forth. A wireless network interface 1012 may include one or more radios.

The mobile device 110 may also include one or more busses or other internal communications hardware or software that allow for the transfer of data between the various modules and components of the mobile device 110.

As shown in FIG. 10, the mobile device 110 includes one or more memories 1016. The memory 1016 may comprise one or more non-transitory CRSM. The memory 1016 provides storage of computer-readable instructions, data structures, program modules, and other data for the operation of the mobile device 110. A few example functional modules are shown stored in the memory 1016, although the same functionality may alternatively be implemented in hardware, firmware, or as a SoC.

The memory 1016 may include at least one OS module 1018. The OS module 1018 is configured to manage hardware resource devices such as the I/O interfaces 1010, the I/O devices 1014, the communication interfaces 1008, and provide various services to applications or modules executing on the processors 1004. The OS module 1018 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 1016 may be a data store 1020 and one or more of the following modules. These modules may be executed as foreground applications, background tasks, daemons, and so forth. The data store 1020 may use a flat file, database, linked list, tree, executable code, script, or other data structure to store information. In some implementations, the data store 1020 or a portion of the data store 1020 may be distributed across one or more other devices including the servers 122, network attached storage devices, and so forth.

A communication module 1022 may be configured to establish communications with one or more of the totes 112, sensors 118, display devices 808(3), servers 122, or other devices. The communications may be authenticated, encrypted, and so forth.

The memory 1016 may store a device data acquisition module 1024. The device data acquisition module 1024 may be configured to generate device data 130. The device data acquisition module 1024 may access sensor data 1026 provided by the sensors 118 onboard the mobile device 110, or associated with the mobile device 110. For example, the device data acquisition module 1024 may access accelerometer data from a fitness tracking device in communication with the mobile device 110.

The device data acquisition module 1024 may be configured to send the device data 130 comprising the device ID 132 and the motion data 134. For example, the device data acquisition module 1024 may receive a command from the tracking system 124, requesting device data 130. The device data acquisition module 1024 may either retrieve previously stored motion data 134, or begin acquiring motion data 134.

In some implementations the device data 130 may include other information. For example, the device data 130 may include operational data 1028. The operational data 1028 may be indicative of other applications executing on the mobile device 110 using output from the sensors 118. For example, the mobile device 110 may be executing a game that uses motion data 134 provided by the IMU as player input. The operational data 1028 may indicate that the mobile device 110 is currently configured to acquire motion data 134 from an IMU and provide that motion data 130 for use other than by the device data acquisition module 1024. The operational data 1028 may be used to filter or pre-process the device data 130. For example, the motion analysis module 136 may be considered to disregard motion data 134 that is acquired while the operational data 1028 indicates a gaming application is executing. This prevents the motion analysis module 136 from attempting to analyze motions that are the result of game inputs as a result of hand motions, and not just walking or stopping motions. In another implementation the operational data 1028 may be used to prevent motion data 134 that is potentially erroneous or excessively noisy from being sent to the motion analysis module 136. Continuing the example, while the game play is in progress, no motion data 134 may be acquired for use by the motion analysis module 136.

The device data acquisition module 1024 may be configured to send the device data 130 stored in the data store 1020 to the communication module 1022 for transmission by the network interface 1012. In some implementations, the packet transmitted by the mobile device 110 may include a header that indicates the device ID 132 while the payload comprises the motion data 134. In some implementations, the transmission may be made as a broadcast. For example, the device data 130 may be sent as a Bluetooth broadcast, WiFi broadcast, and so forth. A receiver in the facility 102 may detect this device data 130, and forward it to the tracking system 124.

In some implementations, the device data acquisition module 1024 may send the device data 130 to the server 122. For example, the device data acquisition module 1024 may establish a connection with the server 122 and send the device data 130 using the connection.

The device data acquisition module 1024 may send the device data 130 either upon receipt of a request for data, at predetermined time intervals, when a predetermined amount of motion data 134 has been acquired, and so forth.

Other modules 1030 may also be present in the memory 1016 as well as other data 1032 in the data store 1020. For example, the other modules 1030 may include an application to present a shopping list to the user 108 for picking at the facility 702.

By using the devices and techniques described in this disclosure, the identities of users 108 may be asserted and associated with object representations used in a visual tracking module 126 to produce tracking data 154. This tracking data 154 may be used by an inventory management system 710 or other systems.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
    determining a first type of motion of an object, using first data from a camera;
    receiving second data associated with a device;
    determining a second type of motion based on the second data;
    determining the second type of motion is consistent with the first type of motion; and
    associating the device with the object.

2. The method of claim 1, wherein the second data represents accelerometer data indicative of a direction and a magnitude of acceleration of a tote.

3. The method of claim 2, further comprising:
    determining the tote is associated with a user;
    retrieving a user identifier associated with the tote; and
    associating the user identifier with the object.

4. The method of claim 1, wherein:
    the second data represents movement data associated with the device, as acquired by one or more of:
        one or more accelerometers of the device, or
        one or more gyroscopes of the device.

5. The method of claim 1, further comprising:
    retrieving a user identifier associated with the device; and
    associating the user identifier with the object.

6. The method of claim 1, further comprising:
    generating first movement data of the object based on the first data;
    generating second movement data of the device based on the second data; and
    wherein a first portion of the first movement data exhibiting the first type of motion is within a first threshold of a second portion of the second movement data exhibiting the second type of motion.

7. The method of claim 1, wherein the first data from the camera comprises a plurality of images acquired at different times; and the determining the first type of motion of the object comprises:
    determining, for each image in the plurality of images, a depiction of the object;
    determining, based on the depiction of the object in the each image, apparent motion of the object; and
    determining the first type of motion based on the apparent motion of the object.

8. The method of claim 1, further comprising:
    generating first movement data of the object based on the first data, wherein the first movement data is indicative of the first type of motion at a first time;
    generating second movement data of the device based on the second data, wherein the second movement data is indicative of the device exhibiting the second type of motion at a second time; and
    determining a difference between the first time and the second time is within a threshold time value.

9. The method of claim 1, wherein:
    the first type of motion and the second type of motion are indicative of one or more of:
        start of movement,
        stop of movement,
        movement having a characteristic that is below a first threshold value,
        movement having a characteristic that is above a second threshold value,
        movement in a first direction,
        start of rotation,
        stop of rotation,
        rotation at a rate greater than a third threshold value,
        rotation at a rate less than a fourth threshold value, or
        rotation in a second direction.

10. A system comprising:
    a camera to acquire first data associated with an object;
    a device comprising:
        one or more sensors to detect motion;
        a first memory, storing first computer-executable instructions; and
        a first hardware processor to execute the first computer-executable instructions to:
            send second data associated with motion of the device; and
    a server comprising:
        a second memory, storing second computer-executable instructions; and
        a second hardware processor to execute the second computer-executable instructions to:
            acquire the first data from the camera;
            determine a first type of motion of the object based on the first data;
            receive the second data from the device;
            determine a second type of motion based on the second data;
            determine the second type of motion is consistent with the first type of motion; and
            associate the device with the object.

11. The system of claim 10, further comprising:
    a tote, wherein the device is part of the tote; and
        the second hardware processor to further execute the second computer-executable instructions to:
            determine the tote is associated with a user;
            retrieve a user identifier associated with the user; and
            associate the user identifier with the object.

12. The system of claim 10, the second hardware processor to further execute the second computer-executable instructions to:
    determine a user identifier associated with the device; and
    associate the user identifier with the object.

13. The system of claim 10, the second hardware processor to further execute the second-computer executable instructions to:
    generate first movement data of the object based on the first data, wherein the first type of motion comprises an actual trajectory of the object as determined using the first movement data;
    generate second movement data associated with the device based on the second data, wherein the second type of motion comprises an estimated trajectory of the device as determined using the second movement data; and
    determine the actual trajectory is within a threshold value of the estimated trajectory.

14. The system of claim 10, the second hardware processor to further execute the second-computer executable instructions to:
    generate first movement data of the object based on the first data, wherein the first movement data is indicative of the object exhibiting the first type of motion at a first time;
    generate second movement data associated with the device based on the second data, wherein the second movement data is indicative of the device exhibiting the second type of motion at a second time; and
    determine a difference between the first time and the second time is within a threshold time value.

15. The system of claim 10, the first data comprising a plurality of images acquired by the camera over a period of time; and the second-computer executable instructions to determine the first type of motion of the object further comprising instructions to:
  determine a depiction of the object in each of the plurality of images; and
  determine apparent motion of the object.

16. The system of claim 10, wherein:
the one or more sensors comprise one or more of:
  accelerometers, or
  gyroscopes;
the second data comprises motion data from the one or more sensors; and
the second hardware processor to further execute the second computer-executable instructions to:
  generate movement data for the device based on the second data.

17. A method comprising:
detecting an object representation of an object depicted in one or more images;
determining a first type of motion of the object representation using the one or more images;
determining the object representation is not assigned an object identifier;
acquiring data from one or more devices;
determining a corresponding type of motion associated with each of the one or more devices using the data;
determining a first device of the one or more devices exhibits a second type of motion that is consistent with the first type of motion; and
associating the object representation with the first device.

18. The method of claim 17, further comprising:
retrieving a user identifier associated with the first device; and
associating the user identifier with the object representation.

19. The method of claim 17, further comprising:
determining the first device is included in a tote;
determining the tote is associated with a user;
retrieving a user identifier associated with the user; and
associating the user identifier with the object representation.

20. The method of claim 17, wherein:
the one or more devices represent a candidate set of devices; and
each device in the candidate set is unassigned to a corresponding object identifier when the object representation is determined to be unassigned to an object identifier.

* * * * *